US012720074B2

(12) United States Patent
Zhang et al.

(10) Patent No.: US 12,720,074 B2
(45) Date of Patent: Aug. 25, 2026

(54) VARIABLE-RATE NEURAL NETWORK BASED COMPRESSION

(71) Applicants: Douyin Vision (Beijing) Co., Ltd., Beijing (CN); Bytedance Inc., Los Angeles, CA (US)

(72) Inventors: Zhaobin Zhang, San Diego, CA (US); Semih Esenlik, San Diego, CA (US); Yaojun Wu, Beijing (CN); Yue Li, San Diego, CA (US); Kai Zhang, San Diego, CA (US); Li Zhang, San Diego, CA (US)

(73) Assignees: DOUYIN VISION (BEIJING) CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/982,647

(22) Filed: Dec. 16, 2024

(65) Prior Publication Data

US 2025/0119552 A1 Apr. 10, 2025

Related U.S. Application Data

(63) Continuation of application No. PCT/CN2023/100681, filed on Jun. 16, 2023.

(51) Int. Cl.
*H04N 19/149* (2014.01)
*H04N 19/122* (2014.01)
*H04N 19/186* (2014.01)

(52) U.S. Cl.
CPC ......... *H04N 19/149* (2014.11); *H04N 19/122* (2014.11); *H04N 19/186* (2014.11)

(58) Field of Classification Search
CPC ........ H04N 19/19; H04N 19/80; H04N 19/85; H04N 19/117; H04N 19/122;
(Continued)

(56) References Cited

U.S. PATENT DOCUMENTS 6,490,320 B1 12/2002 Vetro
2017/0150180 A1* 5/2017 Lin ........................ H04N 19/59
(Continued)

FOREIGN PATENT DOCUMENTS

CN 101783948 A 7/2010
CN 109495741 A 3/2019
(Continued)

OTHER PUBLICATIONS

Z. Cheng, H. Sun, M. Takeuchi and J. Katto, "Learned image compression with discretized gaussian mixture likelihoods and attention modules," in Proceedings of the IEEE/CVF Conference on Computer Vision and Pattern Recognition, pp. 7939-7948, 2020.
(Continued)

*Primary Examiner* — Peet Dhillon
(74) *Attorney, Agent, or Firm* — Conley Rose, P.C.

(57) ABSTRACT

A mechanism for processing video data is disclosed. A determination is made to resize an image with a first size to create a resized image with a second size. A conversion is performed between a visual media data and a bitstream based on the resized image. The conversion includes applying a neural network-based coding model to the resized image to achieve variable rate neural network-based compression.

20 Claims, 12 Drawing Sheets

(58) Field of Classification Search
CPC .. H04N 19/132; H04N 19/147; H04N 19/149; H04N 19/186
See application file for complete search history.

(56) References Cited

U.S. PATENT DOCUMENTS

| | | | | |
|---|---|---|---|---|
| 2019/0230285 | A1* | 7/2019 | Kim | H04N 19/59 |
| 2020/0304147 | A1 | 9/2020 | Choi | |
| 2022/0103864 | A1* | 3/2022 | Wang | H04N 19/192 |
| 2022/0109860 | A1* | 4/2022 | Chen | H04N 19/82 |
| 2023/0125477 | A1* | 4/2023 | Gurumurthy | G06N 3/08 382/103 |
| 2024/0242481 | A1* | 7/2024 | Rosewarne | H04N 19/186 |

FOREIGN PATENT DOCUMENTS

| | | | | |
|---|---|---|---|---|
| CN | 113225554 | A | 8/2021 | |
| EP | 3799431 | A1 | 3/2021 | |
| EP | 4167571 | A1 * | 4/2023 | G06N 3/08 |
| JP | 2023548823 | A * | 11/2023 | G06N 3/0455 |

OTHER PUBLICATIONS

Document: JVET-S2001-vH, Bross, B., et al., "Versatile Video Draft (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
R. D. Dony and S. Haykin, "Neural network approaches to image compression," Proceedings of the IEEE, vol. 83, No. 2, Feb. 1995, 16 pages.
Z. Wang, A. C. Bovik, H. R. Sheikh, and E. P. Simoncelli, "Image quality assessment: From error visibility to structural similarity," IEEE Transactions on Image Processing, vol. 13, No. 4, Apr. 2004, pp. 600-612.
Bjontegaard, G., "Calculation of average PSNR differences between RD-curves," VCEG, Tech. Rep. VCEG-M33, ITU—Telecommunications Standardization Sector, Study Group 16 Question 6 Video Coding Experts Group (VCEG) Thirteenth Meeting: Austin, Texas, USA, Apr. 2-4, 2001, 4 pages.
C. E. Shannon, "A mathematical theory of communication," Reprinted with corrections from The Bell System Technical Journal, vol. 27, pp. 379-423, 623-656, July, Oct. 1948.
H. Larochelle and I. Murray, "The neural autoregressive distribution estimator," in Proceedings of the Fourteenth International Conference on Artificial Intelligence and Statistics, 2011, pp. 29-37.
K. Gregor and Y. LeCun, "Learning representations by maximizing compression," arXiv:1108.1169v1 [cs.CV] Aug. 4, 2011, 8 pages.
B. Uria, I. Murray, and H. Larochelle, "RNADE: The real-valued neural autoregressive density-estimator," in NIPS, 2013, pp. 2175-2183.
L. Theis and M. Bethge, "Generative image modeling using spatial LSTMs," in NIPS, arXiv:1306.0186v2 [stat. ML] Jan. 9, 2014, pp. 1927-1935.
B. Uria, I. Murray and H. Larochelle, "A deep and tractable density estimator," in ICML, arXiv:1310.1757v2 [stat. ML] Jan. 11, 2014, pp. 467-475.
A. van den Oord, N. Kalchbrenner, and K. Kavukcuoglu, "Pixel recurrent neural networks," in ICML, 2016, pp. 1747-1756.
A. van den Oord, N. Kalchbrenner, O. Vinyals, L. Espeholt, A. Graves, and K. Kavukcuoglu, "Conditional image generation with PixelCNN decoders," 30th Conference on Neural Information Processing Systems (NIPS 2016), pp. 4790-4798.
T. Salimans, A. Karpathy, X. Chen, and D. P. Kingma, "PixelCNN++: Improving the PixelCNN with discretized logistic mixture likelihood and other modifications," arXiv preprint arXiv:1701.05517, Published as a conference paper at ICLR 2017, 10 pages.
X. Chen, N. Mishra, M. Rohaninejad, and p. Abbeel, "PixelSNAIL: An improved autoregressive generative model," in ICML, 2018, pp. 863-871.
G. E. Hinton and R. R. Salakhutdinov, "Reducing the dimensionality of data with neural networks," Science, vol. 313, No. 5786, Jul. 28, 2006, 4 pages.
G. Toderici, S. M. O'Malley, S. J. Hwang, D. Vincent, D. Minnen, S. Baluja, M. Covell, and R. Sukthankar, "Variable rate image compression with recurrent neural networks," arXiv:1511.06085v5 [cs.CV] Mar. 1, 2016, 12 pages.
G. Toderici, D. Vincent, N. Johnston, S. J. Hwang, D. Minnen, J. Shor, and M. Covell, "Full resolution image compression with recurrent neural networks," in CVPR, 2017, pp. 5306-5314.
N. Johnston, D. Vincent, D. Minnen, M. Covell, S. Singh, T. Chinen, S. Jin Hwang, J. Shor, and G. Toderici, "Improved lossy image compression with priming and spatially adaptive bit rates for recurrent networks," in CVPR, 2018, pp. 4385-4393.
M. Covell, N. Johnston, D. Minnen, S. J. Hwang, J. Shor, S. Singh, D. Vincent, and G. Toderici, "Target-quality image compression with recurrent, convolutional neural networks," arXiv preprint arXiv:1705.06687v1 [cs.CV] May 18, 2017, 5 pages.
J. Balle, V. Laparra, and E. P. Simoncelli, "End-to-end optimization of nonlinear transform codes for perceptual quality," in PCS. IEEE, arXiv:1607.05006v2 [cs.IT] Oct. 17, 2016, 5 pages.
J. Balle, "Efficient nonlinear transforms for lossy image compression," Picture Coding Symposium 2018, arXiv:1802.00847v2 [eess.IV] Jul. 31, 2018, 6 pages.
J. Balle, V. Laparra and E. P. Simoncelli, "End-to-end optimized image compression," in International Conference on Learning Representations, 2017, 27 pages.
J. Balle, D. Minnen, S. Singh, S. Hwang and N. Johnston, "Variational image compression with a scale hyperprior," in International Conference on Learning Representations, arXiv:1802.01436v2 [eess.IV] May 1, 2018, 23 pages.
D. Minnen, J. Balle, G. Toderici, "Joint Autoregressive and Hierarchical Priors for Learned Image Compression", arXiv:1809.02736v1 [cs. CV] Sep. 8, 2018, 22 pages.
Z. Cheng, H. Sun M. Takeuchi and J. Katto, "Learned Image Compression with Discretized Gaussian Mixture Likelihoods and Attention Modules," in Proceedings of the IEEE/CVF Conference on Computer Vision and Pattern Recognition (CVPR), arXiv:2001.01568v3 [eess.IV] Mar. 30, 2020, 15 pages.
Github repository "CompressAI: https://github.com/InterDigitalInc/CompressAI," InterDigital Inc, accessed Feb. 24, 2025, 6 pages.
T. Chen, H. Liu, Q. Shen, T. Yue, X. Cao, and Z. Ma, "DeepCoder: A Deep Neural Network Based Video Compression," IEEE, VCIP 2017, Dec. 10-13, 2017, St Petersburg, U.S.A., 4 pages.
C.-Y. Wu, N. Singhal, and P. Krahenbuhl, "Video Compression through Image Interpolation," in Proceedings of the European Conference on Computer Vision (ECCV), arXiv:1804.06919v1 [cs.CV] Apr. 18, 2018, 18 pages.
Z. Chen, T. He, X. Jin, and F. Wu, "Learning for Video Compression," IEEE Transactions on Circuits and Systems for Video Technology, DOI: 10.1109/TCSVT.2019.2892608, arXiv:1804.09869v2 [cs.MM] Jan. 9, 2019, 11 pages.
G. Lu, W. Ouyang, D. Xu, X. Zhang, C. Cai, and Z. Gao, "DVC: An end-to-end deep video compression framework," in Proceedings of the IEEE/CVF Conference on Computer Vision and Pattern Recognition (CVPR), 2019, 10 pages.
O. Rippel, S. Nair, C. Lew, S. Branson, A. Anderson and L. Bourdev, "Learned Video Compression," 2019 IEEE/CVF International Conference on Computer Vision (ICCV), Seoul, Korea (South), 2019, pp. 3453-3462, doi: 10.1109/ICCV.2019.00355, 10 pages.
G. Toderici, D. Vincent, N. Johnston, S. J. Hwang, D. Minnen, J. Shor, and M. Covell, "Full resolution image compression with recurrent neural networks," in CVPR, arXiv:1608.05148v2 [cs.CV] Jul. 7, 2017, 9 pages.
A. Habibian, T. Rozendaal, J. Tomczak and T. Cohen, "Video Compression with Rate- Distortion Autoencoders," in Proceedings of the IEEE/CVF International Conference on Computer Vision (ICCV), 2019, pp. 7033-7042.
J. Lin, D. Liu, H. Li and F. Wu, "M-LVC: Multiple frames prediction for learned video compression," in Proceedings of the IEEE/CVF Conference on Computer Vision and Pattern Recognition (CVPR), 2020, 9 pages.

(56) References Cited

OTHER PUBLICATIONS

E. Agustsson, D. Minnen, N. Johnston, J. Balle, S. J. Hwang and G. Toderici, “Scale-Space Flow for End-to-End Optimized Video Compression,” 2020 IEEE/CVF Conference on Computer Vision and Pattern Recognition (CVPR), Seattle, WA, USA, 2020, doi: 10.1109/CVPR42600.2020.00853, pp. 8503-8512.
Z. Hu, Z. Chen, D. Xu, G. Lu, W. Ouyang and S. Gu, “Improving deep video compression by resolution-adaptive flow coding,” in European Conference on Computer Vision (ECCV) 2020, 16 pages.
Abdelaziz Djelouah, Joaquim Campos, Simone Schaub- Meyer, and Christopher Schroers, “Neural Inter-Frame Compression for Video Coding,” In ICCV, pp. 6421-6429, Oct. 2019, 9 pages.
Toderici, G., OMalley, S.M., Hwang, S.J., Vincent, D., Minnen, D., Baluja, S., Covell, M. and Sukthankar, R., 2015. Variable rate image compression with recurrent neural networks, arXiv:1511.06085v5 [cs.CV] Mar. 1, 2016, 12 pages.
Y. Choi, M. El-Khamy, and J. Lee, Variable rate deep image compression with a conditional autoencoder, in Proceedings of the IEEE/CVF International Conference on Computer Vision, 2019, pp. 3146-3154.
Cui, Z., Wang, J., Bai, B., Guo, T. and Feng, Y., “G-VAE: A continuously variable rate deep image compression framework,” arXiv:2003.02012v1 [eess.IV] Mar. 4, 2020, 8 pages.
H. Ma, D. Liu, N. Yan, H. Li and F. Wu, “End-to-End Optimized Versatile Image Compression With Wavelet-Like Transform,” in IEEE Transactions on Pattern Analysis and Machine Intelligence, vol. 44, No. 3, Mar. 2022, doi: 10.1109/TPAMI.2020.3026003, 17 pages.
International Search Report from PCT Application No. PCT/CN2023/100681 dated Sep. 8, 2023, 7 pages.

* cited by examiner

| Component | Symbol |
|---|---|
| Input Image | X |
| Encoder | $f(X;\theta_e)$ |
| Latents | y |
| Latents (quantized) | $\hat{y}$ |
| Decoder | $g(\hat{y};\theta_d)$ |
| Hyper Encoder | $f_h(y;\theta_{he})$ |
| Hyper-latents | z |
| Hyper-latents (quant) | $\hat{z}$ |
| Hyper Decoder | $g_h(\hat{z};\theta_{hd})$ |
| Context model | $g_{cm}(y_{<i};\theta_{cm})$ |
| Entropy Parameters | $g_{ep}(\cdot;\theta_{ep})$ |
| Reconstruction | $\hat{X}$ |

VARIABLE-RATE NEURAL NETWORK BASED COMPRESSION

CROSS-REFERENCE TO RELATED APPLICATIONS

This patent application is a continuation of International Patent Application No. PCT/CN2023/100681, filed on Jun. 16, 2023, which claims the priority to and benefits of International Patent Application No. PCT/CN2022/099107, filed on Jun. 16, 2022. All the aforementioned patent applications are hereby incorporated by reference in their entireties.

TECHNICAL FIELD

This document relates to processing of digital images and video.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining to resize an image with a first size to create a resized image with a second size; and performing a conversion between a visual media data and a bitstream based on the resized image, wherein the conversion includes applying a neural network-based coding model to the resized image to achieve variable rate neural network-based compression.

A second aspect relates to apparatus for processing video data comprising: a processor; and a non-transitory memory with instructions thereon, wherein the instructions upon execution by the processor, cause the processor to perform the method of any of the preceding aspects.

A third aspect relates to a non-transitory computer readable medium storing a bitstream of a video which is generated by a method performed by a video processing apparatus, wherein the method comprises: determining to resize an image with a first size to create a resized image with a second size; and generating a bitstreambased on the determining, wherein the generating includes applying a neural network-based coding model to the resized image to achieve variable rate neural network-based compression.

A fourth aspect relates to a method for storing bitstream of a video comprising: determining to resize an image with a first size to create a resized image with a second size; generating a bitstream based on the determining, wherein the generating includes applying a neural network-based coding model to the resized image to achieve variable rate neural network-based compression; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
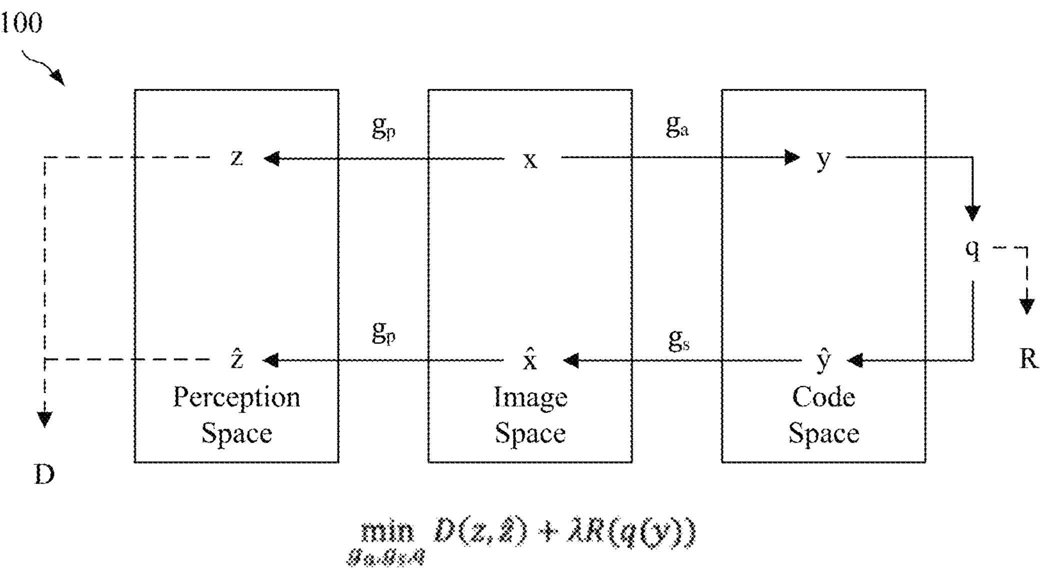
FIG. 1 is a schematic diagram illustrating an example transform coding scheme.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This patent document is related to neural network-based image and video compression. The described techniques relate to a variable-rate neural network-based image and/or video compression mechanism. In example application scenarios, a certain amount of rate is required for optimal transmission efficiency. This application presents a mechanism to achieve variable rate through resizing for neural network-based image/video compression. The disclosed examples are designed for an end-to-end neural network-based system. The disclosed examples may also be applicable to a hybrid compression framework, where neural network-based coding tools are integrated into the framework of the other video coding standards, such as high efficiency video coding (HEVC), versatile video coding (VVC), or other video coding standards.

Deep learning is developing in a variety of areas, such as in computer vision and image processing. Inspired by the successful application of deep learning technology to computer vision areas, neural image/video compression technologies are being studied for application to image/video compression techniques. The neural network is designed based on interdisciplinary research of neuroscience and mathematics. The neural network has shown strong capabilities in the context of non-linear transform and classification. An example neural network-based image compression algorithm achieves comparable rate distortion (R-D) performance with Versatile Video Coding (VVC), which is a video coding standard developed by the Joint Video Experts Team (JVET) with experts from motion picture experts group (MPEG) and Video coding experts group (VCEG). Neural network-based video compression is an actively developing research area resulting in continuous improvement of the performance of neural image compression. However, neural network-based video coding is still a largely undeveloped discipline due to the inherent difficulty of the problems addressed by neural networks.

Image and/or video compression is now discussed. Image/video compression usually refers to a computing technology that compresses video images into binary code to facilitate storage and transmission. The binary codes may or may not support losslessly reconstructing the original image/video. Coding without data loss is known as lossless compression and coding while allowing for targeted loss of data is known as lossy compression, respectively. Most coding systems employ lossy compression since lossless reconstruction is not necessary in most scenarios. Usually the performance of image/video compression algorithms is evaluated based on a resulting compression ratio and reconstruction quality. Compression ratio is directly related to the number of binary codes resulting from compression, with fewer binary codes resulting in better compression. Reconstruction quality is measured by comparing the reconstructed image/video with the original image/video, with greater similarity resulting in better reconstruction quality.

Image/video compression techniques can be divided into video coding methods and neural-network-based video compression methods. Video coding schemes adopt transform-based solutions, in which statistical dependency in latent variables, such as discrete cosine transform (DCT) and wavelet coefficients, is employed to carefully hand-engineer entropy codes to model the dependencies in the quantized regime. Neural network-based video compression can be grouped into neural network-based coding tools and end-to-end neural network-based video compression. The former is embedded into existing video codecs as coding tools and only serves as part of the framework, while the latter is a separate framework developed based on neural networks without depending on video codecs.

A series of video coding standards have been developed to accommodate the increasing demands of visual content transmission. The international organization for standardization (ISO)/International Electrotechnical Commission (IEC) has two expert groups, namely Joint Photographic Experts Group (JPEG) and Moving Picture Experts Group (MPEG). International Telecommunication Union (ITU) telecommunication standardization sector (ITU-T) also has a Video Coding Experts Group (VCEG), which is for standardization of image/video coding technology. The influential video coding standards published by these organizations include Joint Photographic Experts Group (JPEG), JPEG 2000, H.262, H.264/advanced video coding (AVC) and H.265/High Efficiency Video Coding (HEVC). The Joint Video Experts Team (JVET), formed by MPEG and VCEG, developed the Versatile Video Coding (VVC) standard. An average of 50% bitrate reduction is reported by VVC under the same visual quality compared with HEVC.

Neural network-based image/video compression/coding is also under development. Example neural network coding network architectures are relatively shallow, and the performance of such networks is not satisfactory. Neural network-based methods benefit from the abundance of data and the support of powerful computing resources, and are therefore better exploited in a variety of applications. Neural network-based image/video compression has shown promising improvements and is confirmed to be feasible. Nevertheless, this technology is far from mature and a lot of challenges should be addressed.

Neural networks, also known as artificial neural networks (ANN), are computational models used in machine learning technology. Neural networks are usually composed of multiple processing layers, and each layer is composed of multiple simple but non-linear basic computational units. One benefit of such deep networks is a capacity for processing data with multiple levels of abstraction and converting data into different kinds of representations. Representations created by neural networks are not manually designed. Instead, the deep network including the processing layers is learned from massive data using a general machine learning procedure. Deep learning eliminates the necessity of handcrafted representations. Thus, deep learning is regarded useful especially for processing natively unstructured data, such as acoustic and visual signals. The processing of such data has been a longstanding difficulty in the artificial intelligence field.

Neural networks for image compression can be classified in two categories, including pixel probability models and auto-encoder models. Pixel probability models employ a predictive coding strategy. Auto-encoder models employ a transform-based solution. Sometimes, these two methods are combined together.

Pixel probability modeling is now discussed. According to Shannon's information theory, the optimal method for lossless coding can reach the minimal coding rate, which is denoted as $-\log_2 p(x)$ where $p(x)$ is the probability of symbol x. Arithmetic coding is a lossless coding method that is believed to be among the optimal methods. Given a probability distribution $p(x)$, arithmetic coding causes the coding rate to be as close as possible to a theoretical limit $-\log_2 p(x)$ without considering the rounding error. Therefore, the remaining problem is to determine the probability, which is very challenging for natural image/video due to the curse of dimensionality. The curse of dimensionality refers to the problem that increasing dimensions causes data sets to become sparse, and hence rapidly increasing amounts of data is needed to effectively analyze and organize data as the number of dimensions increases.

Following the predictive coding strategy, one way to model $p(x)$ is to predict pixel probabilities one by one in a raster scan order based on previous observations, where x is an image, can be expressed as follows:

$$p(x) = p(x_1)p(x_2|x_1) \ldots p(x_i|x_1, \ldots, x_{i-1}) \ldots p(x_{m\times n}|x_1, \ldots, x_{m\times n-1}) \quad (1)$$

where m and n are the height and width of the image, respectively. The previous observation is also known as the context of the current pixel. When the image is large, estimation of the conditional probability can be difficult.

Thereby, a simplified method is to limit the range of the context of the current pixel as follows:

$$p(x)=p(x_1)p(x_2|x_1)\ldots p(x_i|x_{i-k},\ldots,x_{i-1})\ldots p(x_{m\times n}|x_{m\times n-k},\ldots,x_{m\times n-1}) \quad (2)$$

where k is a pre-defined constant controlling the range of the context.

It should be noted that the condition may also take the sample values of other color components into consideration. For example, when coding the red (R), green (G), and blue (B) (RGB) color component, the R sample is dependent on previously coded pixels (including R, G, and/or B samples), the current G sample may be coded according to previously coded pixels and the current R sample. Further, when coding the current B sample, the previously coded pixels and the current R and G samples may also be taken into consideration.

Neural networks may be designed for computer vision tasks, and may also be effective in regression and classification problems. Therefore, neural networks may be used to estimate the probability of $p(x_i)$ given a context $x_1, x_2, \ldots, x_{i-1}$. In an example neural network design, the pixel probability is employed for binary images according to $x_i \in \{-1, +1\}$. The neural autoregressive distribution estimator (NADE) is designed for pixel probability modeling. NADE is a feed-forward network with a single hidden layer. In another example, the feed-forward network may include connections skipping the hidden layer. Further, the parameters may also be shared. Such neural networks are used to perform experiments on the binarized Modified National Institute of Standards and Technology (MNIST) dataset. In an example, NADE is extended to a real-valued NADE (RNADE) model, where the probability $p(x_i|x_1, \ldots, x_{i-1})$ is derived with a mixture of Gaussians. The RNADE model feed-forward network also has a single hidden layer, but the hidden layer employs rescaling to avoid saturation and uses a rectified linear unit (ReLU) instead of sigmoid. In another example, NADE and RNADE are improved by using reorganizing the order of the pixels and with deeper neural networks.

Designing advanced neural networks plays an important role in improving pixel probability modeling. In an example neural network, a multi-dimensional long short-term memory (LSTM) is used. The LSTM works together with mixtures of conditional Gaussian scale mixtures for probability modeling. LSTM is a special kind of recurrent neural networks (RNNs) and may be employed to model sequential data. The spatial variant of LSTM may also be used for images. Several different neural networks may be employed, including recurrent neural networks (RNNs) and convolutional neural networks (CNNs), such as Pixel RNN (PixelRNN) and Pixel CNN (PixelCNN), respectively. In PixelRNN, two variants of LSTM, denoted as row LSTM and diagonal bidirectional LSTM (BiLSTM) are employed. Diagonal BiLSTM is specifically designed for images. PixelRNN incorporates residual connections to help train deep neural networks with up to twelve layers. In PixelCNN, masked convolutions are used to adjust for the shape of the context. PixelRNN and PixelCNN are more dedicated to natural images. For example, PixelRNN and PixelCNN consider pixels as discrete values (e.g., 0, 1, . . . , 255) and predict a multinomial distribution over the discrete values. Further, PixelRNN and PixelCNN deal with color images in RGB color space. In addition, PixelRNN and PixelCNN work well on the large-scale image dataset image network (ImageNet). In an example, a Gated PixelCNN is used to improve the PixelCNN. Gated PixelCNN achieves comparable performance with PixelRNN, but with much less complexity. In an example, a PixelCNN++ is employed with the following improvements upon PixelCNN: a discretized logistic mixture likelihood is used rather than a 256-way multinomial distribution; down-sampling is used to capture structures at multiple resolutions; additional short-cut connections are introduced to speed up training; dropout is adopted for regularization; and RGB is combined for one pixel. In another example, PixelSNAIL combines casual convolutions with self-attention.

Most of the above methods directly model the probability distribution in the pixel domain. Some designs also model the probability distribution as conditional based upon explicit or latent representations. Such a model can be expressed as:

$$p(x|h)=\prod_{i=1}^{m\times n} p(x_i|x_1,\ldots,x_{i-1},h) \quad (3)$$

where h is the additional condition and p(x)=p(h)p(x|h) indicates the modeling is split into an unconditional model and a conditional model. The additional condition can be image label information or high-level representations.

An Auto-encoder is now described. The auto-encoder is trained for dimensionality reduction and include an encoding component and a decoding component. The encoding component converts the high-dimension input signal to low-dimension representations. The low-dimension representations may have reduced spatial size, but a greater number of channels. The decoding component recovers the high-dimension input from the low-dimension representation. The auto-encoder enables automated learning of representations and eliminates the need of hand-crafted features, which is also believed to be one of the most important advantages of neural networks.

FIG. 1 is a schematic diagram illustrating an example transform coding scheme 100. The original image x is transformed by the analysis network $g_a$ to achieve the latent representation y. The latent representation y is quantized (q) and compressed into bits. The number of bits R is used to measure the coding rate. The quantized latent representation $\hat{y}$ is then inversely transformed by a synthesis network $g_s$ to obtain the reconstructed image $\hat{x}$. The distortion (D) is calculated in a perceptual space by transforming x and $\hat{x}$ with the function $g_p$, resulting in z and $\hat{z}$, which are compared to obtain D.

An auto-encoder network can be applied to lossy image compression. The learned latent representation can be encoded from the well-trained neural networks. However, adapting the auto-encoder to image compression is not trivial since the original auto-encoder is not optimized for compression, and is thereby not efficient for direct use as a trained auto-encoder. In addition, other major challenges exist. First, the low-dimension representation should be quantized before being encoded. However, the quantization is not differentiable, which is required in backpropagation while training the neural networks. Second, the objective under a compression scenario is different since both the distortion and the rate need to be taken into consideration. Estimating the rate is challenging. Third, a practical image coding scheme should support variable rate, scalability, encoding/decoding speed, and interoperability. In response to these challenges, various schemes are under development.

An example auto-encoder for image compression using the example transform coding scheme 100 can be regarded as a transform coding strategy. The original image x is transformed with the analysis network $y=g_a(x)$, where y is the latent representation to be quantized and coded. The synthesis network inversely transforms the quantized latent representation $\hat{y}$ back to obtain the reconstructed image $\hat{x}=g_s(\hat{y})$. The framework is trained with the rate-distortion loss function, $\mathcal{L}=D+\lambda R$, where D is the distortion between x and $\hat{x}$, R is the rate calculated or estimated from the quantized representation $\hat{y}$, and $\lambda$ is the Lagrange multiplier. D can be calculated in either pixel domain or perceptual domain. Most example systems follow this prototype and the differences between such systems might only be the network structure or loss function.

In terms of network structure, RNNs and CNNs are the most widely used architectures. In the RNNs relevant category, an example general framework for variable rate image compression uses RNN. The example uses binary quantization to generate codes and does not consider rate during training. The framework provides a scalable coding functionality, where RNN with convolutional and deconvolution layers performs well. Another example offers an improved version by upgrading the encoder with a neural network similar to PixelRNN to compress the binary codes. The performance is better than JPEG on a Kodak image dataset using multi-scale structural similarity (MS-SSIM) evaluation metric. Another example further improves the RNN-based solution by introducing hidden-state priming. In addition, an SSIM-weighted loss function is also designed, and a spatially adaptive bitrates mechanism is included. This example achieves better results than better portable graphics (BPG) on the Kodak image dataset using MS-SSIM as evaluation metric. Another example system supports spatially adaptive bitrates by training stop-code tolerant RNNs.

Another example proposes a general framework for rate-distortion optimized image compression. The example system uses multiary quantization to generate integer codes and considers the rate during training. The loss is the joint rate-distortion cost, which can be mean square error (MSE) or other metrics. The example system adds random uniform noise to stimulate the quantization during training and uses the differential entropy of the noisy codes as a proxy for the rate. The example system uses generalized divisive normalization (GDN) as the network structure, which includes a linear mapping followed by a nonlinear parametric normalization. The effectiveness of GDN on image coding is verified. Another example system includes improved version that uses three convolutional layers each followed by a down-sampling layer and a GDN layer as the forward transform. Accordingly, this example version uses three layers of inverse GDN each followed by an up-sampling layer and convolution layer to stimulate the inverse transform. In addition, an arithmetic coding method is devised to compress the integer codes. The performance is reportedly better than JPEG and JPEG 2000 on Kodak dataset in terms of MSE. Another example improves the method by devising a scale hyper-prior into the auto-encoder. The system transforms the latent representation y with a subnet $h_a$ to $z=h_a(y)$ and z is quantized and transmitted as side information. Accordingly, the inverse transform is implemented with a subnet $h_s$ that decodes from the quantized side information $\hat{z}$ to the standard deviation of the quantized $\hat{y}$, which is further used during the arithmetic coding of $\hat{y}$. On the Kodak image set, this method is slightly worse than BGP in terms of peak signal to noise ratio (PSNR). Another example system further exploits the structures in the residue space by introducing an autoregressive model to estimate both the standard deviation and the mean. This example uses a Gaussian mixture model to further remove redundancy in the residue. The performance is on par with VVC on the Kodak image set using PSNR as evaluation metric.

Figure 2:
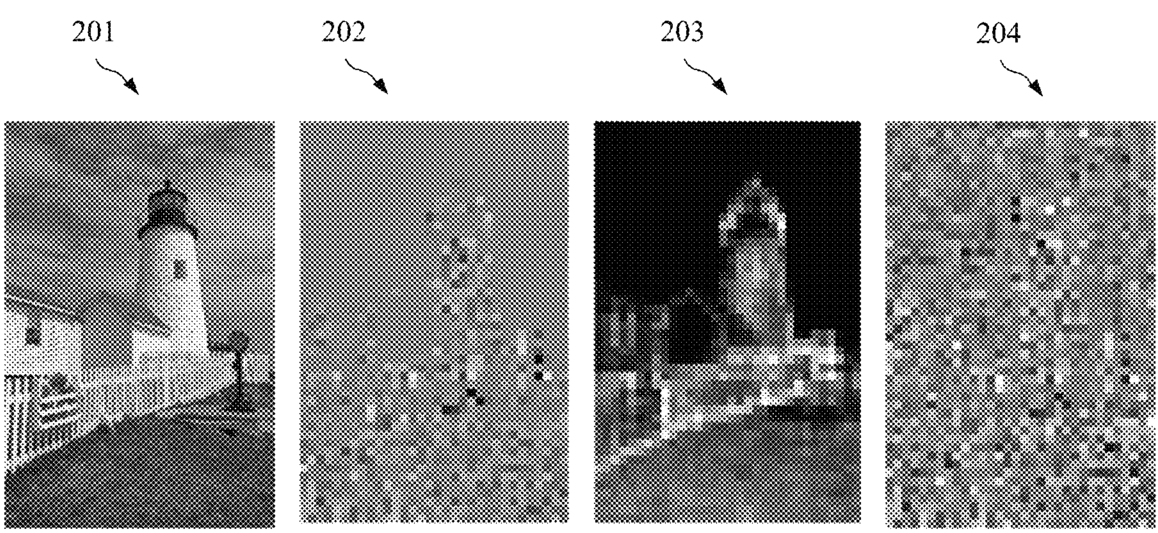
FIG. 2 illustrates example latent representations of an image.

FIG. 2 illustrates example latent representations of an image. FIG. 2 includes an image 201 from the Kodak dataset, visualization of the latent 202 representation y of the image 201, a standard deviation a 203 of the latent 202, and latents y 204 after a hyper prior network is introduced. A hyper prior network includes a hyper encoder and decoder. A hyper prior model is now discussed. In the transform coding approach to image compression, as shown in FIG. 1, the encoder subnetwork transforms the image vector x using a parametric analysis transform $g_a(x, \O_g)$ into a latent representation y, which is then quantized to form $\hat{y}$. Because $\hat{y}$ is discrete-valued, $\hat{y}$ can be losslessly compressed using entropy coding techniques such as arithmetic coding and transmitted as a sequence of bits.

As evident from the latent 202 and the standard deviations a 203 of FIG. 2, there are significant spatial dependencies among the elements of $\hat{y}$. Notably, their scales (standard deviations $\sigma$ 203) appear to be coupled spatially. An additional set of random variables $\hat{z}$ may be introduced to capture the spatial dependencies and to further reduce the redundancies. In this case the image compression network is depicted in FIG. 3.

Figure 3:
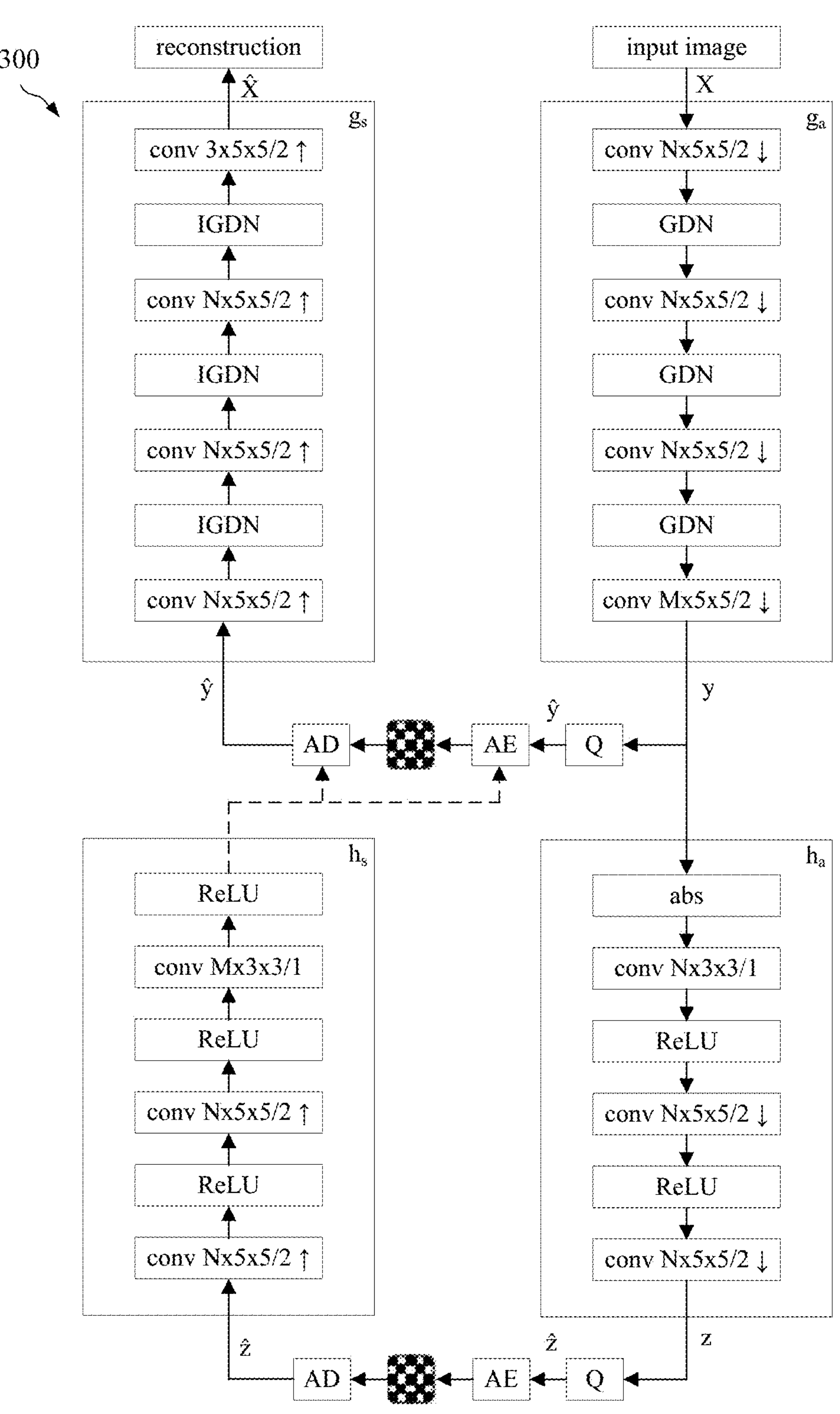
FIG. 3 is a schematic diagram illustrating an example autoencoder implementing a hyperprior model.

FIG. 3 is a schematic diagram 300 illustrating an example network architecture of an autoencoder implementing a hyperprior model. The upper side shows an image autoencoder network, and the lower side corresponds to the hyperprior subnetwork. The analysis and synthesis transforms are denoted as $g_a$ and $g_a$. Q represents quantization (Q), and AE, AD represent arithmetic encoder (AE) and arithmetic decoder (AD), respectively. The hyperprior model includes two subnetworks, hyper encoder (denoted with $h_a$) and hyper decoder (denoted with $h_s$). The hyper prior model generates a quantized hyper latent ($\hat{z}$) which comprises information related to the probability distribution of the samples of the quantized latent $\hat{y}$. $\hat{z}$ is included in the bitstream and transmitted to the receiver (decoder) along with $\hat{y}$.

In schematic diagram 300, the upper side of the models is the encoder $g_a$ and decoder $g_s$ as discussed above. The lower side is the additional hyper encoder $h_a$ and hyper decoder $h_s$ networks that are used to obtain $\hat{z}$. In this architecture the encoder subjects the input image x to $g_a$, yielding the responses y with spatially varying standard deviations. The responses y are fed into $h_a$, summarizing the distribution of standard deviations in z. z is then quantized ($\hat{z}$), compressed, and transmitted as side information. The encoder then uses the quantized vector $\hat{z}$ to estimate $\sigma$, the spatial distribution of standard deviations, and uses a to compress and transmit the quantized image representation $\hat{y}$. The decoder first recovers $\hat{z}$ from the compressed signal. The decoder then uses $h_s$ to obtain $\sigma$, which provides the decoder with the correct probability estimates to successfully recovery as well. The decoder then feeds $\hat{y}$ into $g_s$ to obtain the reconstructed image.

When the hyper encoder and hyper decoder are added to the image compression network, the spatial redundancies of the quantized latent $\hat{y}$ are reduced. The latents y 204 in FIG. 2 correspond to the quantized latent when the hyper encoder/decoder are used. Compared to the standard deviations $\sigma$ 203, the spatial redundancies are significantly reduced as the samples of the quantized latent are less correlated.

A context model is now discussed. Although the hyper prior model improves the modelling of the probability distribution of the quantized latent $\hat{y}$, additional improvement can be obtained by utilizing an autoregressive model that predicts quantized latents from their causal context, which may be known as a context model. The term autoregressive indicates that the output of a process is later used as an input to the process. For example, the context model subnetwork generates one sample of a latent, which is later used as input to obtain the next sample.

Figure 4:
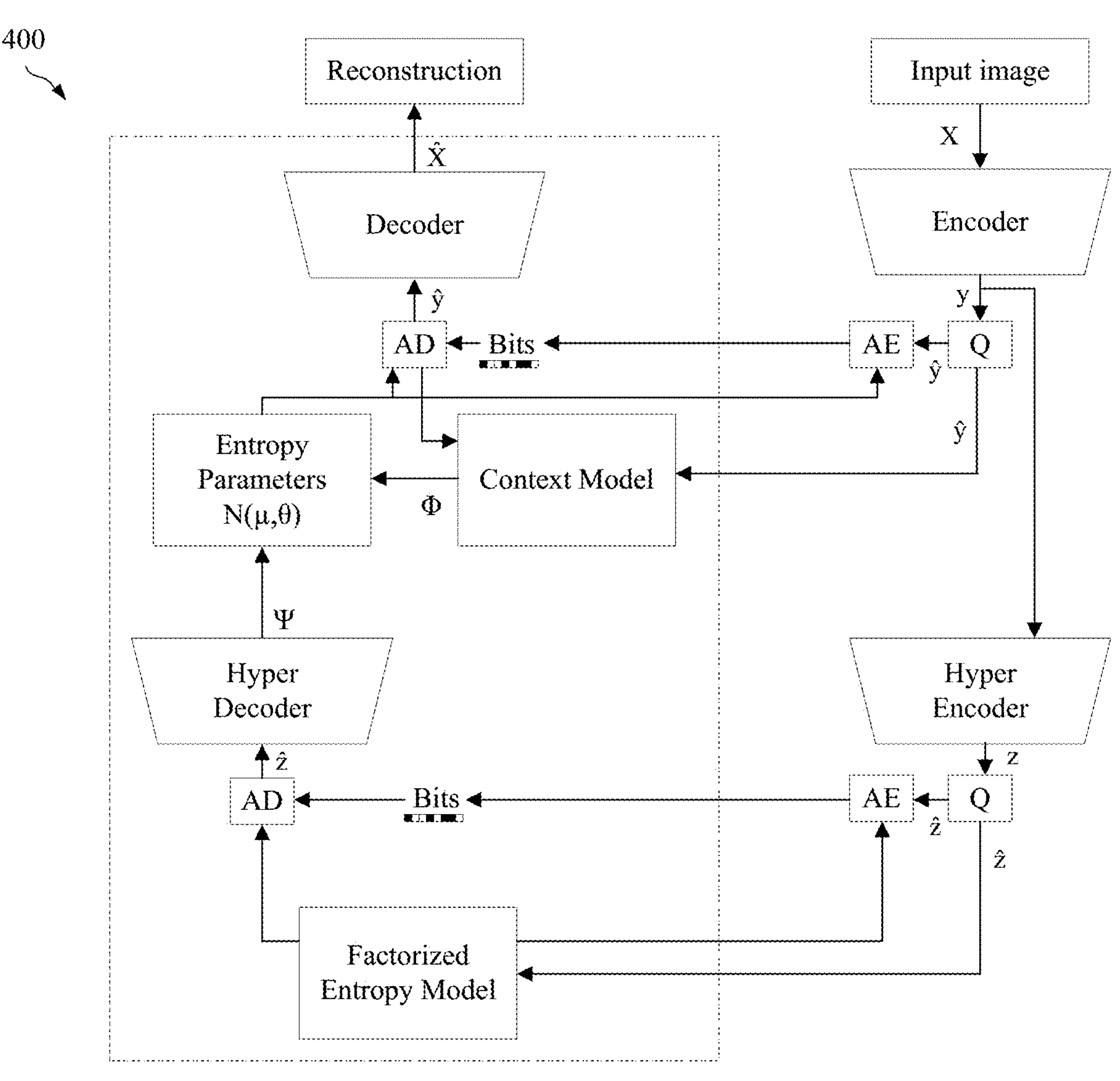
FIG. 4 is a schematic diagram illustrating an example combined model configured to jointly optimize a context model along with a hyperprior and the autoencoder.

FIG. 4 is a schematic diagram 400 illustrating an example combined model configured to jointly optimize a context model along with a hyperprior and the autoencoder. The combined model jointly optimizes an autoregressive component that estimates the probability distributions of latents from their causal context (Context Model) along with a hyperprior and the underlying autoencoder. Real-valued latent representations are quantized (Q) to create quantized latents ($\hat{y}$) and quantized hyper-latents ($\hat{z}$), which are compressed into a bitstream using an arithmetic encoder (AE) and decompressed by an arithmetic decoder (AD). The dashed region corresponds to the components that are executed by the receiver (e.g., a decoder) to recover an image from a compressed bitstream.

An example system utilizes a joint architecture where both a hyper prior model subnetwork (hyper encoder and hyper decoder) and a context model subnetwork are utilized. The hyper prior and the context model are combined to learn a probabilistic model over quantized latents $\hat{y}$, which is then used for entropy coding. As depicted in schematic diagram 400, the outputs of the context subnetwork and hyper decoder subnetwork are combined by the subnetwork called Entropy Parameters, which generates the mean $\mu$ and scale (or variance) $\sigma$ parameters for a Gaussian probability model. The gaussian probability model is then used to encode the samples of the quantized latents into bitstream with the help of the arithmetic encoder (AE) module. In the decoder the gaussian probability model is utilized to obtain the quantized latents $\hat{y}$ from the bitstream by arithmetic decoder (AD) module.

In an example, the latent samples are modeled as gaussian distribution or gaussian mixture models (not limited to). In the example according to the schematic diagram 400, the context model and hyper prior are jointly used to estimate the probability distribution of the latent samples. Since a gaussian distribution can be defined by a mean and a variance (aka sigma or scale), the joint model is used to estimate the mean and variance (denoted as $\mu$ and $\sigma$).

Variable-rate neural network based image compression is now discussed. A few methodologies may be used to realize variable-rate image compression using neural networks. In an example, a fully connected autoencoder paired with recurrent neural network (RNN) with variable rate support may be employed. To realize a variable rate, the RNN may only be trained once, but multiple iterations may be employed in a test phase. In each iteration, the network encodes the residual between the output of last iteration and the original image.

In another example, a conditional autoencoder can be employed to realize variable rate control. In the conditional autoencoder framework, two rate control parameters are used, which includes the Lagrange multiplier and the quantization bin size. The former is used to realize coarse rate adjustment, while the latter is to adjust a rate in a finer level. Multiple combinations of these two parameters are used in the training stage.

In an example, a continuously variable rate can be obtained for neural network-based image compression by employing a gained variable auto encoder. In this framework, a gain unit is placed after the output of the encoder and an inverse gain unit is placed before the input of the decoder. The gain unit is a set of trainable vectors applied to the feature maps before they are entropy coded.

In an example, a wavelet-like neural network-based transform may be employed. The example employs a trainable wavelet-like neural network-based transform. This transform converts images into coefficients without any information loss, which provides the capability of both lossy and lossless coding. In lossy coding, the coefficients are optionally encoded.

Usage of neural networks for video compression is now discussed. Similar to video coding technologies, neural image compression serves as the foundation of intra compression in neural network-based video compression. Thus, development of neural network-based video compression technology is behind development of neural network-based image compression because neural network-based video compression technology is of greater complexity and hence needs far more effort to solve the corresponding challenges. Compared with image compression, video compression needs efficient methods to remove inter-picture redundancy. Inter-picture prediction is then a major step in these example systems. Motion estimation and compensation is widely adopted in video codecs, but is not generally implemented by trained neural networks.

Neural network-based video compression can be divided into two categories according to the targeted scenarios: random access and the low-latency. In random access case, the system allows decoding to be started from any point of the sequence, typically divides the entire sequence into multiple individual segments, and allows each segment to be decoded independently. In a low-latency case, the system aims to reduce decoding time, and thereby temporally previous frames can be used as reference frames to decode subsequent frames.

Low-latency systems are now discussed. An example system employs a video compression scheme with trained neural networks. The system first splits the video sequence frames into blocks and each block is coded according to an intra coding mode or an inter coding mode. If intra coding is selected, there is an associated auto-encoder to compress the block. If inter coding is selected, motion estimation and compensation are performed and a trained neural network is used for residue compression. The outputs of auto-encoders are directly quantized and coded by the Huffman method.

Another neural network-based video coding scheme employs PixelMotionCNN. The frames are compressed in the temporal order, and each frame is split into blocks which are compressed in the raster scan order. Each frame is first extrapolated with the preceding two reconstructed frames. When a block is to be compressed, the extrapolated frame along with the context of the current block are fed into the PixelMotionCNN to derive a latent representation. Then the residues are compressed by a variable rate image scheme. This scheme performs on par with H.264.

Another example system employs an end-to-end neural network-based video compression framework, in which all the modules are implemented with neural networks. The scheme accepts a current frame and a prior reconstructed frame as inputs. An optical flow is derived with a pre-trained neural network as the motion information. The motion information is warped with the reference frame followed by a neural network generating the motion compensated frame. The residues and the motion information are compressed with two separate neural auto-encoders. The whole framework is trained with a single rate-distortion loss function. The example system achieves better performance than H.264.

Another example system employs an advanced neural network-based video compression scheme. The system inherits and extends video coding schemes with neural networks with the following major features. First the system uses only one auto-encoder to compress motion information and residues. Second, the system uses motion compensation with multiple frames and multiple optical flows. Third, the system uses an on-line state that is learned and propagated through the following frames over time. This scheme achieves better performance in MS-SSIM than HEVC reference software.

Another example system uses an extended end-to-end neural network-based video compression framework. In this example, multiple frames are used as references. The example system is thereby able to provide more accurate prediction of a current frame by using multiple reference frames and associated motion information. In addition, a motion field prediction is deployed to remove motion redundancy along temporal channel. Postprocessing networks are also used to remove reconstruction artifacts from previous processes. The performance of this system is better than H.265 by a noticeable margin in terms of both PSNR and MS-SSIM.

Another example system uses scale-space flow to replace an optical flow by adding a scale parameter based on a framework. This example system may achieve better performance than H.264. Another example system uses a multi-resolution representation for optical flows based. Concretely, the motion estimation network produces multiple optical flows with different resolutions and let the network learn which one to choose under the loss function. The performance is slightly better than H.265.

Systems that employ random access are now discussed. Another example system uses a neural network-based video compression scheme with frame interpolation. The key frames are first compressed with a neural image compressor and the remaining frames are compressed in a hierarchical order. The system performs motion compensation in the perceptual domain by deriving the feature maps at multiple spatial scales of the original frame and using motion to warp the feature maps. The results are used for the image compressor. The method is on par with H.264.

An example system uses a method for interpolation-based video compression. The interpolation model combines motion information compression and image synthesis. The same auto-encoder is used for image and residual. Another example system employs a neural network-based video compression method based on variational auto-encoders with a deterministic encoder. Concretely, the model includes an auto-encoder and an auto-regressive prior. Different from previous methods, this system accepts a group of pictures (GOP) as inputs and incorporates a three dimensional (3D) autoregressive prior by taking into account of the temporal correlation while coding the latent representations. This system provides comparative performance as H.265.

Preliminaries are now discussed. Almost all the natural image and/or video is in digital format. A grayscale digital image can be represented by $x \in \mathbb{D}^{m \times n}$, where $\mathbb{D}$ is the set of values of a pixel, m is the image height, and n is the image width. For example, $\mathbb{D}=\{0, 1, 2, \ldots, 255\}$ is an example setting, and in this case $|\mathbb{D}|=256=2^B$. Thus, the pixel can be represented by an 8-bit integer. An uncompressed grayscale digital image has 8 bits-per-pixel (bpp), while compressed bits are definitely less.

A color image is typically represented in multiple channels to record the color information. For example, in the RGB color space an image can be denoted by $x \in \mathbb{D}^{m \times n \times 3}$ with three separate channels storing Red, Green, and Blue information. Similar to the 8-bit grayscale image, an uncompressed 8-bit RGB image has 24 bpp. Digital images/videos can be represented in different color spaces. The neural network-based video compression schemes are mostly developed in RGB color space while the video codecs typically use a YUV color space to represent the video sequences. In YUV color space, an image is decomposed into three channels, namely luma (Y), blue difference chroma (Cb) and red difference chroma (Cr). Y is the luminance component and Cb and Cr are the chroma components. The compression benefit to YUV occurs because Cb and Cr are typically down sampled to achieve pre-compression since human vision system is less sensitive to chroma components.

A color video sequence is composed of multiple color images, also called frames, to record scenes at different timestamps. For example, in the RGB color space, a color video can be denoted by $X=\{x_0, x_1, \ldots, x_t, \ldots, x_{T-1}\}$ where T is the number of frames in a video sequence and $x \in \mathbb{D}^{m \times n}$. If m=1080, n=1920, $|\mathbb{D}|=2^B$, and the video has 50 frames-per-second (fps), then the data rate of this uncompressed video is 1920×1080×8×3×50=2,488,320,000 bits-per-second (bps). This results in about 2.32 gigabits per second (Gbps), which uses a lot of storage and should be compressed before transmission over the internet.

Usually the lossless methods can achieve a compression ratio of about 1.5 to 3 for natural images, which is clearly below streaming requirements. Therefore, lossy compression is employed to achieve a better compression ratio, but at the cost of incurred distortion. The distortion can be measured by calculating the average squared difference between the original image and the reconstructed image, for example based on MSE. For a grayscale image, MSE can be calculated with the following equation.

$$MSE = \frac{\|x - \hat{x}\|^2}{m \times n} \tag{4}$$

Accordingly, the quality of the reconstructed image compared with the original image can be measured by peak signal-to-noise ratio (PSNR):

$$PSNR = 10 \times \log_{10} \frac{(\max(\mathbb{D}))^2}{MSE} \tag{5}$$

where $\max(\mathbb{D})$ is the maximal value in $\mathbb{D}$, e.g., 255 for 8-bit grayscale images. There are other quality evaluation metrics such as structural similarity (SSIM) and multi-scale SSIM (MS-SSIM).

To compare different lossless compression schemes, the compression ratio given the resulting rate, or vice versa, can be compared. However, to compare different lossy compression methods, the comparison has to take into account both the rate and reconstructed quality. For example, this can be accomplished by calculating the relative rates at several different quality levels and then averaging the rates. The average relative rate is known as Bjontegaard's delta-rate (BD-rate). There are other aspects to evaluate image and/or video coding schemes, including encoding/decoding complexity, scalability, robustness, and so on.

The following are example technical problems solved by disclosed technical solutions. The network architecture of the neural network-based codecs should be changed to accommodate variable rate adjustment. The examples described above all employ a dedicated network architecture, which make addition of a variable rate adjustment infeasible in scenarios where such networks have already been well-trained. Further, the networks described above may only handle rate adjustments within a limited range. When extending the rate adjustment range, there may be significant rate-distortion performance drop. For example, multiple models trained with different Lagrange multipliers are still needed to realize rate adjustments in a wide range using a conditional autoencoder. In addition, training strategies may be more complicated using certain variable-rate solutions. For example, using a conditional autoencoder may requires the networks to be trained with randomly sampled Lagrange multiplier and bin size pairs. The loss function is also the average loss of several iterations including multiple Lagrange multiplier and bin size pairs. These factors may hinder usage in real applications.

To solve the above problems, and others, methods as summarized below are disclosed. The items should be considered as examples to explain the general concepts and should not be interpreted in a narrow way. Furthermore, these items can be applied individually or combined in any manner. The techniques described herein provide a variable rate neural network-based image and video compression method using resizing. An objective is to provide the variable-rate flexibility without changing network architectures, for example so that such mechanisms can be used when the fixed rate models are already well-trained. Additional benefits include no retraining is needed, and the rate adjustment can be realized in a wide range. To be specific, instead of using different network architectures, the disclosure describes resizing the input images to different sizes for different target rates. In the following discussion, a frame, a picture, and an image may have the same meaning.

Example 1

In one example, decoded image/video coded with a first size may be resized (such as up-sampling or down-sampling) to a second size.

Example 2

In one example, the image/video with a second size may be resized in a revert way (such as down-sampling or up-sampling) before being coded.

Example 3

In one example, the encoder/decoder uses at least one NN-based model.

Example 4

In one example, the size information may comprise a width and a height. In one example, the width and/or height may be counted in samples of a component (such as the luma component). In one example, the width and/or height may be counted in N (e.g. N=4 or 16) samples of a component (such as the luma component).

Example 5

In one example, the size information of the first size and/or second size may be signaled to the decoder. In one example, the size information of the first size and second size may be signaled independently. In one example, the size information of the first size and second size may be signaled in a predictive way. In one example, the size information of the first size may be signaled and a ratio between the first size and the second size may be signaled. In one example, the size information of the second size may be signaled and a ratio between the first size and the second size may be signaled. In one example, the resized width and height may be proportional to its original width and height. In one example, the ratio may be the same for width and height.

Figures 5, 6:
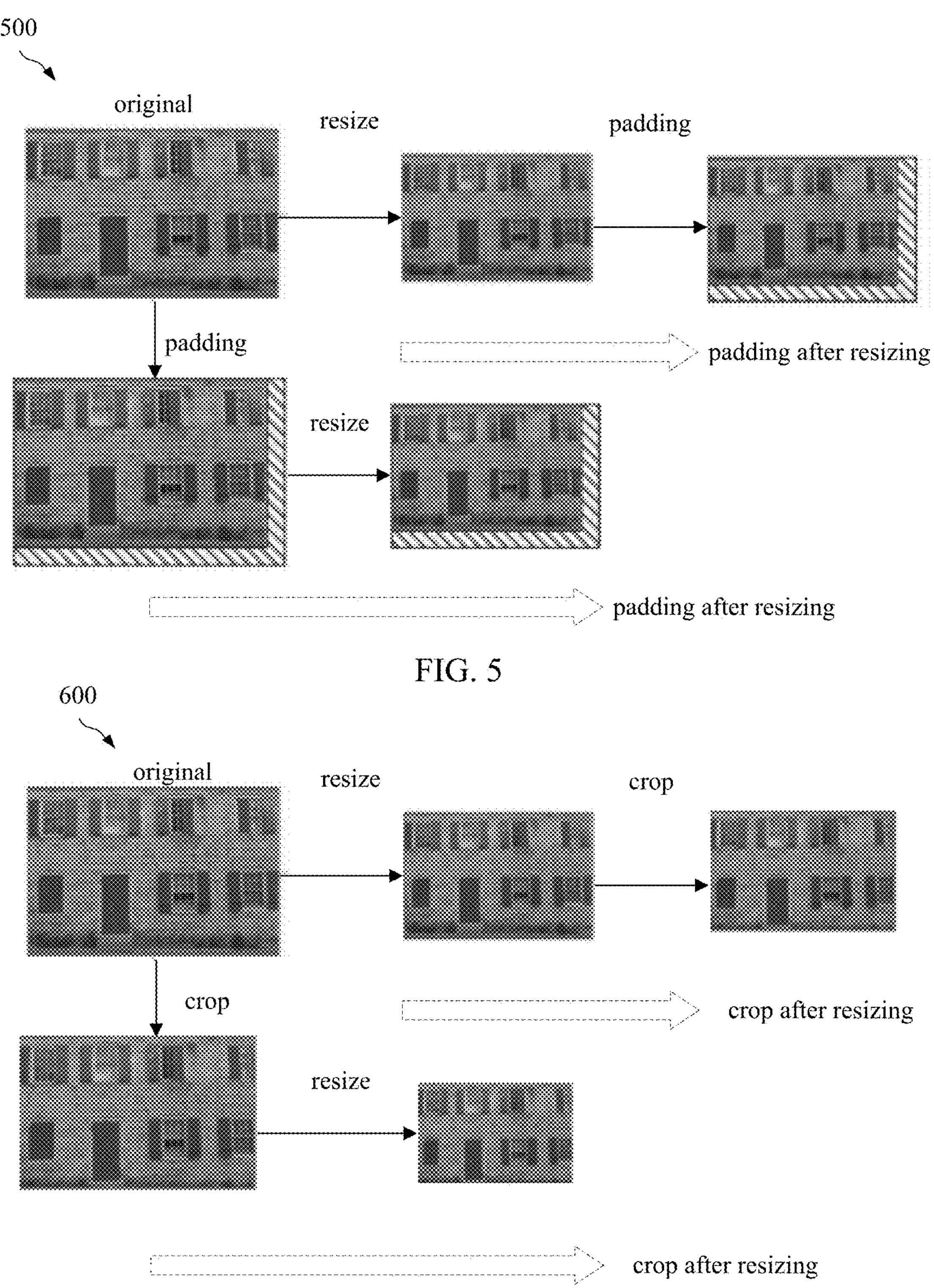
FIG. 5 illustrates an example method of applying padding to an image before and after resizing.
FIG. 6 illustrates an example method of applying cropping to an image before and after resizing.

FIG. 5 illustrates an example method 500 of applying padding to an image before and after resizing. In one example, sample padding may be applied before/after resizing, as illustrated in FIG. 5. FIG. 6 illustrates an example method 600 of applying cropping to an image before and after resizing. In one example, sample cropping may be applied before/after resizing, as illustrated in method 600. In one example, a message may be signaled to indicate whether the image/video should be resized. In one example, the size information of the first size may be signaled only if the image/video should be resized. In one example, the size information of the second size may be signaled only if the image/video should be resized. In one example, the size ratio may be signaled only if the image/video should be resized.

Example 6

In one example, the size information may be signaled with at least one index. The index may refer to a predefined size, width, height, and/or ratio.

Example 7

In one example, how to and/or whether to do resizing may depend on color component or color format (such as YUV444 or YUV 420 or RGB). In one example, different color components may have different resizing methods. For example, luma component may be coded with resizing but a chroma component is not coded with resizing. In an example, the different components of the picture can be resized using different size parameters. For example, a luma component can be resized using a first size parameter and a chroma component can be resized using a second size parameter. The picture can be a reconstructed output picture (output of a decoding process) or an input image. The size parameter might include a width value, a height value, or a combination of the two.

Example 8

In one example, the resizing is performed using a filter.

Example 9

In one example, the filter may be a separable filter, wherein a horizontal filter and a vertical filter is applied to achieve resizing. The filter might be a lanczos filter. The filter might be a bilinear filter or a bicubic filter.

Example 10

In one example, the type of the filter that is used for resizing can be indicated in the bitstream. The length of the filter can be indicated in the bitstream. The length of the filter might be determined by the number of taps of the filter. The length of the filter can be defined as the length of the filter in one of the horizontal or the vertical direction. In an example, at least two different types of the filters can be indicated in the bitstream. The first filter might be applied to one component of the reconstructed output picture, whereas the second filter might be applied to the second component of the reconstructed output picture. The type of the filter might determine the length of the filter or the type of filter can determine the coefficients of the filter.

An index can be indicated in the bitstream to determine which filter in a set of filters is applied for the resizing. In one example, an indication might be obtained from the bitstream to determine which filter among a set of filters is applied for resizing. A first value of the indication might indicate that a 3-tap filter (bicubic filter) is applied for resizing. A second value of the indication might indicate an 8-tap filter is applied for resizing. The 3-tap and 8-tap are provided as an example, and the disclosure is not limited to the provided example. In another example the indication can be used to determine which weight values are used for filtering.

Example 11

In one example, the filter can be implemented as a convolution layer or a deconvolution layer of a neural network.

Example 12

In one example, the set of candidate models which can be used to encode/decode an image/video signal may depend on whether and/or how to resize the image/video before and/or after the coding process.

Example 13

In one example, one model may be determined depending on whether and/or how to resize the image/video before and/or after the coding process.

Example 14

In one example, multiple models may be determined depending on whether and/or how to resize the image/video before and/or after the coding process. In one example, at least one model of the multiple models may be selected and signaled to the decoder. In one example, at least one model of the multiple models may be derived by the decoder. In one example, the multiple models may correspond to multiple bitrates.

Example 15

In one example, one or more models are pretrained with different Lagrange multipliers. The original input image is resized to multiple sizes to obtain multiple candidates given a target rate. Depending on the target bitrate range, only one model might be trained. Depending on the target bitrate range, multiple models might be trained.

The original input image can be downsampled. In one example, the resized width and height can be proportional to the original width and height. In one example, the resized width and height may not be proportional to its original width and height.

In an example, the original image can be upsampled. In one example, the resized width and height can be proportional to the original width and height. In one example, the resized width and height may not be proportional to its original width and height.

To obtain the resized candidates, different strategies might be used. In one example, the network may reduce or increase a certain number of pixels for width or height. In one example, reduce or increase a certain number of total number of pixels. In one example, the network may reduce or increase a certain ratio of the resized size to the original image size. The ratio could be width, height or total number of pixels.

Some conditions may be defined that should be complied with when obtaining the candidates. In one example, a multiple of 64 number of pixels (this number depends on the network architecture, specifically, the number of downsampling convolutions) along both width and height may be required to eliminate possible boundary artifacts. In one example, a multiple of 32 number of pixels (half of the downsampling ratio of the convolutions) along both width and height may be required to eliminate possible boundary artifacts.

In the upsampling or downsampling process, different filters may be used. In one example, filters such as a lanczos filter, a nearest neighbor filter, a bicubic filter, a bilinear filter etc. can be used. In one example, neural network-based filters can be used. For example, deep filters employed for image super resolution can be used. In one example, the encoder and the decoder may use the same type of filter, such as both using a lanczos filter. In one example, the encoder side and the decoder side can use different types of filters. For example, the encoder uses a lanczos filter while the decoder uses bicubic filter.

Example 16

In one example, additional parameters can be encoded in the bitstream. In one example, the resized width and resized height may be encoded into the bitstreams. In one example, the index of resized size can be encoded into the bitstreams, while the encoder and decoder both have the predefined resized size list. In one example, at least one filter index can be encoded to the bitstreams and the decoder may have a list of predefined filter pairs.

Example 17

In one example, a rate-distortion optimization (RDO) process is used to select the one with best rate distortion (RD) performance from all the candidates.

Example 18

In one example, in the RDO process, the anchor results can be used as a reference to calculate RD loss. In one example, results of a codec (for example, versatile video coding test model (VTM), better portable graphics (BPG), Joint Photographic Experts Group (JPEG), JPEG 2000, etc.) can be used as the anchor. In one example, anchor results may be the results of a model obtained by using a fixed quantization parameter (QP) without any resizing strategy. In one example, anchor results may be obtained by selecting the candidate with the best of a specific metric (e.g., multiscale structural similar for image quality assessment model (MS-SSIM) or peak signal to noise ratio (PSNR)) for a certain rate point.

Example 19

In one example, in the RDO process, the RD loss can be on a single metric or on multiple metrics mixed in any manner.

Example 20

In one example, in the RDO process, RD loss can be calculated on a single rate point or on multiple rate points. In one example, there are four rate points in total. In calculating the RD loss, three rate points can be fixed. The RDO process can then traverse all candidates in the 4th rate points and finally select the best one as the 4th rate point. In one example, there are four rate points in total and ten candidates in each rate point. The RDO process may traverse all the combinations ($10^4$ combinations) to obtain the combination with least RD loss.

Example 21

In one example, a message disclosed in this document may be signaled as a flag, a truncated unary code, a truncated binary code, an exponential Golomb code, a fixed length code, or combinations thereof.

Example 22

In one example, a message disclosed in this document may be coded with at least one arithmetic coding context. In an example, a message disclosed in the document may be coded with bypass coding.

An example embodiment is now described. An example variable-rate neural network-based solution may involve a dedicate network architecture, and may also require special training strategies. This might hinder usage of such a network in real applications. In this disclosure, resizing is used to realize a variable rate for neural network-based image and video compression. A set of pretrained models trained with different Lagrange multipliers are employed. The training Lagrange multiplier values are determined by the target bitrate range. When the set of pretrained models are ready, the input images are resized to different sizes, and each of the pretrained models RD loss is used to select the candidate with the minimal RD loss. An example is provided in the following subsections.

Figure 7:
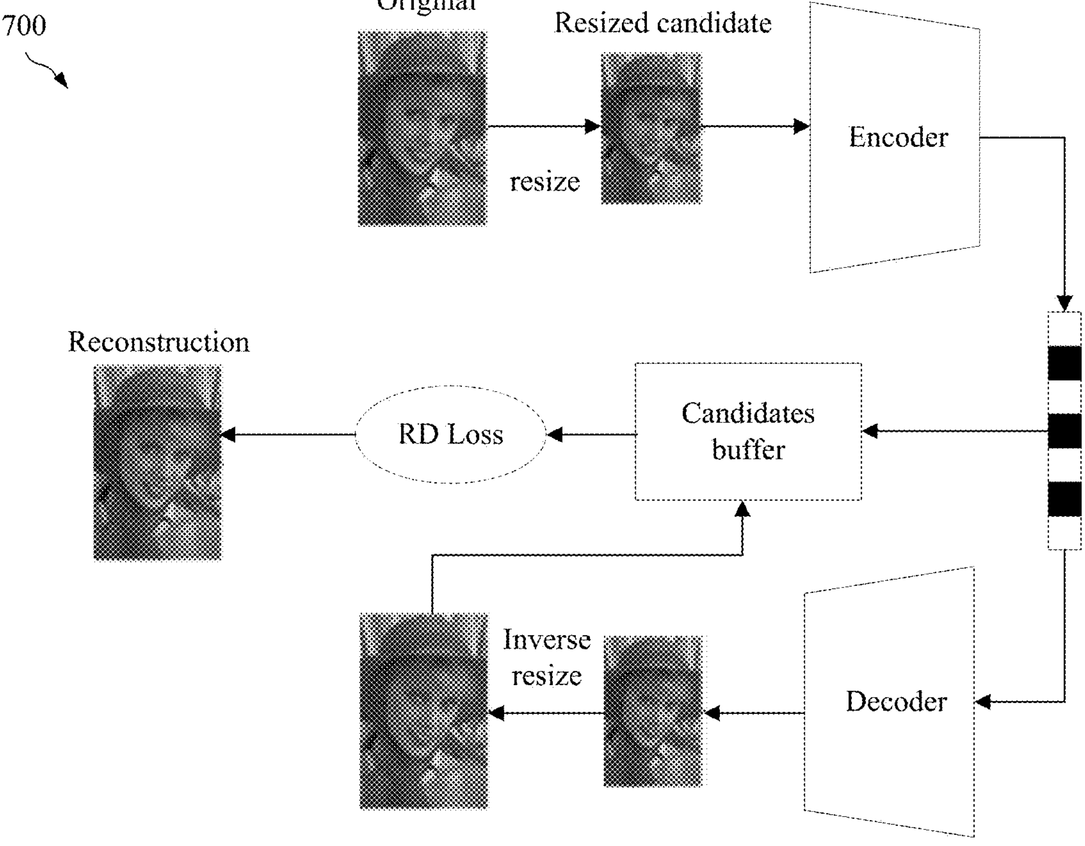
FIG. 7 is a schematic diagram illustrating an example framework for a variable rate neural network-based codec with resizing.

An example framework is as follows. FIG. 7 is a schematic diagram 700 illustrating an example framework for a variable rate neural network-based codec with resizing. Multiple candidates are obtained through resizing the original images. Rate distortion loss is used to select the one with minimal RD loss.

Accordingly, an example of the disclosed examples is depicted in schematic diagram 700. Let x be the original input image, y is the output of analysis transform, $\hat{x}$ is the reconstructed image. The resized image from x with the (k+1)-th pretrained model is denoted as $$x_i^{\downarrow k},$$

where k=0, 1, . . . , N−1 (N is the total number of pretrained models), i=0, 1, . . . , $R_k$−1 ($R_k$ is the total number of resized candidates from the k-th model). After all the candidates are obtained from all the pretrained models, rate distortion loss is used to select the one with minimal loss. The resized size and the filter type may be encoded into the bitstreams.

Variable rate with resizing is now discussed. The first step is to use all pretrained models to encode the given image without resizing to obtain a base rate associated with each pretrained model. The base rate is used to determine if resizing should be used. For a specific pretrained model, if the base rate is smaller than the lower bound, e.g., $R_t(1-s)$, the original image x is not downsampled for this model. Further, the image may be upsampled only when the base rates for all the pretrained models are smaller than the lower bound. If the base rate for a certain model is larger than the upper bound, e.g., $R_t(1+s)$, the image is downsampled. In the implementation, there might be a threshold used to exclude the models with a base rate deviating too much from the target rate. For example, the models producing more than 50% of the target rate are not used for resizing, since this would introduce too much distortion even when the resulting rate is within the required range. It should be noted that, following a predefined candidate generation rule, there might be multiple resized candidates for a specific pretrained model. The following provides some examples to implement the candidate generation.

In an example, the longer edge (width if width>height else height) is reduced by a step (e.g., 64) number of pixels each time, and the other edge is resized proportionally. In an example, shorter edge (width if width<height else height) is reduced by a step (e.g., 64) number of pixels each time and the other edge is resized proportionally. In an example, the total number of pixels may be reduced by a number (num) each time. For the above example, there may be multiple candidates in each step. For example, the candidates' width or height may be rounded to the closest integer, the candidates' width or height may be rounded to a predefined value (e.g., the closest integer which is multiple of 64), the candidates' width may be rounded to the closest integer but height may be rounded to a predefined integer value, or the candidates' width and a height are both rounded to a predefined integer value.

The downsample or upsample filter could be various filters, such as lanczos, bicubic, bilinear, nearest neighbor, etc. The downsample or upsample filter can also be neural network-based filters. In addition, the encoder side and decoder side can be paired with different types of filters. For example, the encoder may use lanczos for downsampling while the decoder uses bicubic for upsampling. In this implementation example, lanczos is used for both encoder side and decoder side.

Candidate selection is discussed. Given an image x, its target rate T and a threshold s, the objective is to achieve a rate that deviates within the threshold range subject to the rate distortion loss. After the candidates are obtained for all the pretrained models. Rate distortion optimization is used to select the best candidate for this specific target rate. The objective can be expressed as $$\arg\min_{\substack{k=0,1,\ldots,N-1\\ i=0,1,\ldots,R_k-1}} \lambda D_{(k,i)} + R_{(k,i)},\ \text{s.t.}\ \left|(R_{(k,i)} - T)/T\right| \times 100\% \le s$$

where k is the pretrained model index, and i is the candidate index. In the example, a Bjontegaard Delta-Rate (BDRate) loss is used to measure the loss. The anchor results are used as the reference to calculate BDRate loss. The anchor results can be obtained in different ways. In an example, the anchor results from another codec, for example H.265, can be used to compress the images and obtain the performance at different rate points. In an example, the results can be obtained by selecting the candidates under the rate constraints with the best on certain evaluation metric, such as MS-SSIM, Video Multimethod Assessment Fusion (VMAF), PSNR etc.

The full RDO process may be performed by traversing all combinations of the available candidates. However, it introduces heavy computational complexity. For example, when there are 4 rate points, if each rate point has 10 candidates, there would be $10^4$ combinations. As a practical alternative, selecting the best candidate for one rate point is much simpler. Once the best candidate for a current rate point is found, move to the next rate point, which follows a similar procedure to find the best candidate. Using the same example, in this case only 40 combinations need to be calculated.

REFERENCES

[1] Z. Cheng, H. Sun, M. Takeuchi and J. Katto, “Learned image compression with discretized gaussian mixture likelihoods and attention modules,” in Proceedings of the IEEE/CVF Conference on Computer Vision and Pattern Recognition, pp. 7939-7948, 2020.

[2] B. Bross, J. Chen, S. Liu and Y.-K. Wang, “Versatile Video Draft (Draft 10),” JVET-S2001, July 2020.

[3] R. D. Dony and S. Haykin, “Neural network approaches to image compression,” Proceedings of the IEEE, vol. 83, no. 2, pp. 288-303, 1995.

[4] Z. Wang, A. C. Bovik, H. R. Sheikh, and E. P. Simoncelli, “Image quality assessment: From error visibility to structural similarity,” IEEE Transactions on Image Processing, vol. 13, no. 4, pp. 600-612, 2004.

[5] G. Bjontegaard, “Calculation of average PSNR differences between RD-curves,” VCEG, Tech. Rep. VCEG-M33, 2001.

[6] C. E. Shannon, “A mathematical theory of communication,” Bell System Technical Journal, vol. 27, no. 3, pp. 379-423, 1948.

[7] H. Larochelle and I. Murray, “The neural autoregressive distribution estimator,” in Proceedings of the Fourteenth International Conference on Artificial Intelligence and Statistics, 2011, pp. 29-37.

[8] K. Gregor and Y. LeCun, “Learning representations by maximizing compression,” arXiv preprint arXiv: 1108.1169, 2011.

[9] B. Uria, I. Murray, and H. Larochelle, “RNADE: The real-valued neural autoregressive density-estimator,” in NIPS, 2013, pp. 2175-2183.

[10] L. Theis and M. Bethge, “Generative image modeling using spatial LSTMs,” in NIPS, 2015, pp. 1927-1935.

[11] B. Uria, I. Murray and H. Larochelle, “A deep and tractable density estimator,” in ICML, 2014, pp. 467-475.

[12] A. van den Oord, N. Kalchbrenner, and K. Kavukcuoglu, “Pixel recurrent neural networks,” in ICML, 2016, pp. 1747-1756.

[13] A. van den Oord, N. Kalchbrenner, O. Vinyals, L. Espeholt, A. Graves, and K. Kavukcuoglu, “Conditional image generation with PixelCNN decoders,” in NIPS, 2016, pp. 4790-4798.

[14] T. Salimans, A. Karpathy, X. Chen, and D. P. Kingma, “PixelCNN++: Improving the PixelCNN with discretized logistic mixture likelihood and other modifications,” arXiv preprint arXiv:1701.05517, 2017.

[15] X. Chen, N. Mishra, M. Rohaninejad, and P. Abbeel, “PixelSNAIL: An improved autoregressive generative model,” in ICML, 2018, pp. 863-871.

[16] G. E. Hinton and R. R. Salakhutdinov, “Reducing the dimensionality of data with neural networks,” Science, vol. 313, no. 5786, pp. 504-507, 2006.

[17] G. Toderici, S. M. O'Malley, S. J. Hwang, D. Vincent, D. Minnen, S. Baluja, M. Covell, and R. Sukthankar, “Variable rate image compression with recurrent neural networks,” arXiv preprint arXiv:1511.06085, 2015.

[18] G. Toderici, D. Vincent, N. Johnston, S. J. Hwang, D. Minnen, J. Shor, and M. Covell, “Full resolution image compression with recurrent neural networks,” in CVPR, 2017, pp. 5306-5314.

[19] N. Johnston, D. Vincent, D. Minnen, M. Covell, S. Singh, T. Chinen, S. Jin Hwang, J. Shor, and G. Toderici, “Improved lossy image compression with priming and spatially adaptive bit rates for recurrent networks,” in CVPR, 2018, pp. 4385-4393.

[20] M. Covell, N. Johnston, D. Minnen, S. J. Hwang, J. Shor, S. Singh, D. Vincent, and G. Toderici, “Target-quality image compression with recurrent, convolutional neural networks,” arXiv preprint arXiv:1705.06687, 2017.

[21] J. Ballé, V. Laparra, and E. P. Simoncelli, “End-to-end optimization of nonlinear transform codes for perceptual quality,” in PCS. IEEE, 2016, pp. 1-5.

[22] J. Ballé, “Efficient nonlinear transforms for lossy image compression,” in 'PCS, 2018, pp. 248-252.

[23] J. Ballé, V. Laparra and E. P. Simoncelli, “End-to-end optimized image compression,” in International Conference on Learning Representations, 2017.

[24] J. Ballé, D. Minnen, S. Singh, S. Hwang and N. Johnston, “Variational image compression with a scale hyperprior,” in International Conference on Learning Representations, 2018.

[25] D. Minnen, J. Ballé, G. Toderici, “Joint Autoregressive and Hierarchical Priors for Learned Image Compression”, arXiv.1809.02736. 1, 2, 3, 4, 7

[26] Z. Cheng, H. Sun M. Takeuchi and J. Katto, “Learned image compression with discretized Gaussian mixture likelihoods and attention modules,” in Proceedings of the IEEE/CVF Conference on Computer Vision and Pattern Recognition (CVPR), 2020.

[27] Github repository “CompressAI: https://github.com/InterDigitalInc/CompressAI,”, InterDigital Inc, accessed December 2020.

[28] T. Chen, H. Liu, Q. Shen, T. Yue, X. Cao, and Z. Ma, “DeepCoder: A deep neural network based video compression,” in VCIP. IEEE, 2017, pp. 1-4.

[29] C.-Y. Wu, N. Singhal, and P. Krahenbuhl, “Video compression through image interpolation,” in Proceedings of the European Conference on Computer Vision (ECCV), 2018, pp. 416-431.

[30] Z. Chen, T. He, X. Jin, and F. Wu, “Learning for video compression,” IEEE Transactions on Circuits and Systems for Video Technology, DOI: 10.1109/TCSVT.2019.2892608, 2019.

[31] G. Lu, W. Ouyang, D. Xu, X. Zhang, C. Cai, and Z. Gao, “DVC: An end-to-end deep video compression framework,” in Proceedings of the IEEE/CVF Conference on Computer Vision and Pattern Recognition (CVPR), 2019.

[32] O. Rippel, S. Nair, C. Lew, S. Branson, A. Anderson and L. Bourdev, "Learned Video Compression," 2019 IEEE/CVF International Conference on Computer Vision (ICCV), Seoul, Korea (South), 2019, pp. 3453-3462, doi: 10.1109/ICCV.2019.00355.
[33] G. Toderici, D. Vincent, N. Johnston, S. J. Hwang, D. Minnen, J. Shor, and M. Covell, "Full resolution image compression with recurrent neural networks," in CVPR, 2017, pp. 5306-5314.
[34] A. Habibian, T. Rozendaal, J. Tomczak and T. Cohen, "Video Compression with Rate-Distortion Autoencoders," in Proceedings of the IEEE/CVF International Conference on Computer Vision (ICCV), 2019, pp. 7033-7042.
[35] J. Lin, D. Liu, H. Li and F. Wu, "M-LVC: Multiple frames prediction for learned video compression," in Proceedings of the IEEE/CVF Conference on Computer Vision and Pattern Recognition (CVPR), 2020.
[36] E. Agustsson, D. Minnen, N. Johnston, J. Ballé, S. J. Hwang and G. Toderici, "Scale-Space Flow for End-to-End Optimized Video Compression," 2020 IEEE/CVF Conference on Computer Vision and Pattern Recognition (CVPR), Seattle, WA, USA, 2020, pp. 8500-8509, doi: 10.1109/CVPR42600.2020.00853.
[37] X. Hu, Z. Chen, D. Xu, G. Lu, W. Ouyang and S. Gu, "Improving deep video compression by resolution-adaptive flow coding," in European Conference on Computer Vision (ECCV) 2020.
[38] Abdelaziz Djelouah, Joaquim Campos, Simone Schaub-Meyer, and Christopher Schroers. Neural interframe compression for video coding. In ICCV, pages 6421-6429, October 2019.
[39] Toderici, G., O'Malley, S. M., Hwang, S. J., Vincent, D., Minnen, D., Baluja, S., Covell, M. and Sukthankar, R., 2015. Variable rate image compression with recurrent neural networks. arXiv preprint arXiv:1511.06085.
[40] Y. Choi, M. El-Khamy, and J. Lee, Variable rate deep image compression with a conditional autoencoder, In Proceedings of the IEEE/CVF International Conference on Computer Vision, pp. 3146-3154. 2019.
[41] Cui, Z., Wang, J., Bai, B., Guo, T. and Feng, Y., 2020. G-VAE: A continuously variable rate deep image compression framework. arXiv preprint arXiv:2003.02012.
[42] H. Ma, D. Liu, N. Yan, H. Li and F. Wu, "End-to-End Optimized Versatile Image Compression With Wavelet-Like Transform," in IEEE Transactions on Pattern Analysis and Machine Intelligence, vol. 44, no. 3, pp. 1247-1263, 1 Mar. 2022, doi: 10.1109/TPAMI.2020.3026003.

Figure 8:
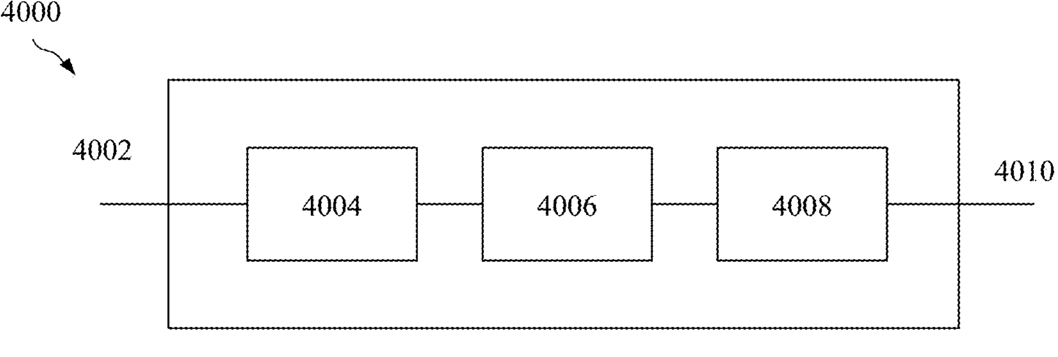
FIG. 8 is a block diagram of an example video processing system.

FIG. 8 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4000 may include a coding component 4004 that may implement the various coding or encoding methods described in the present document. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 9:
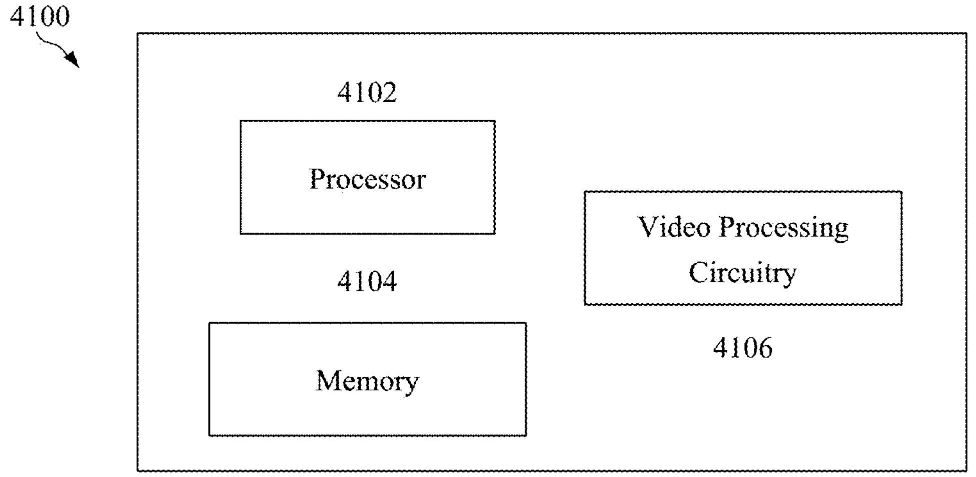
FIG. 9 is a block diagram of an example video processing apparatus.

FIG. 9 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present document. The memory (memories) 4104 may be used for storing data and code used for implementing the methods and techniques described herein. The video processing circuitry 4106 may be used to implement, in hardware circuitry, some techniques described in the present document. In some embodiments, the video processing circuitry 4106 may be at least partly included in the processor 4102, e.g., a graphics co-processor.

Figure 10:
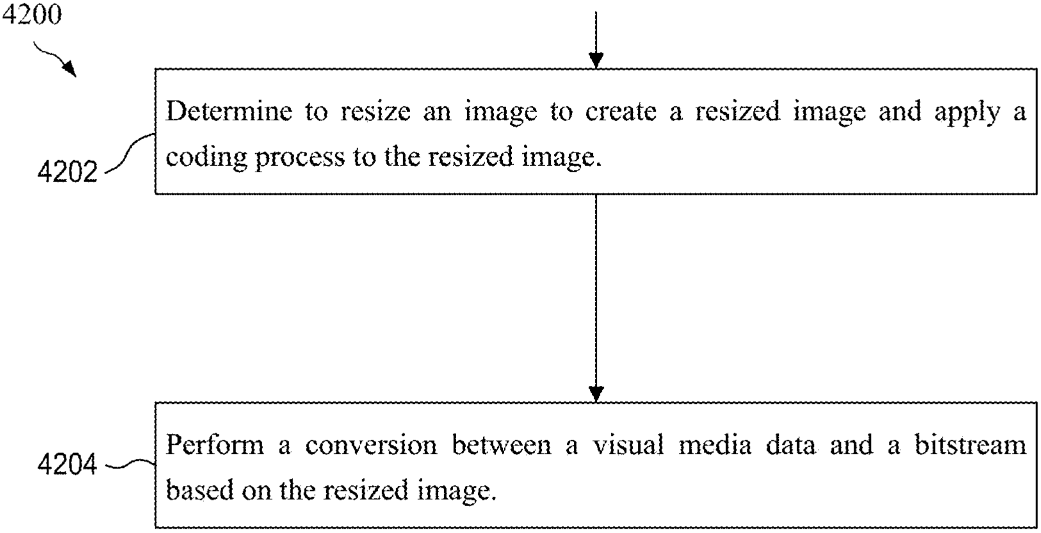
FIG. 10 is a flowchart for an example method of video processing.

FIG. 10 is a flowchart for an example method 4200 of video processing. At step 4202, a determination is made to resize an image to create a resized image and apply a coding process to the resized image. At step 4204, a conversion is performed between a visual media data and a bitstream based on the resized image. The conversion may include encoding at an encoder, decoding at a decoder, or combinations thereof.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200. Further, a non-transitory computer-readable recording medium may store a bitstream of a video which is generated by the method 4200 as performed by a video processing apparatus. In addition, the method 4200 can be performed by an apparatus for processing video data comprising a processor and a non-transitory memory with instructions thereon. The instructions, upon execution by the processor, cause the processor to perform method 4200.

Figure 11:
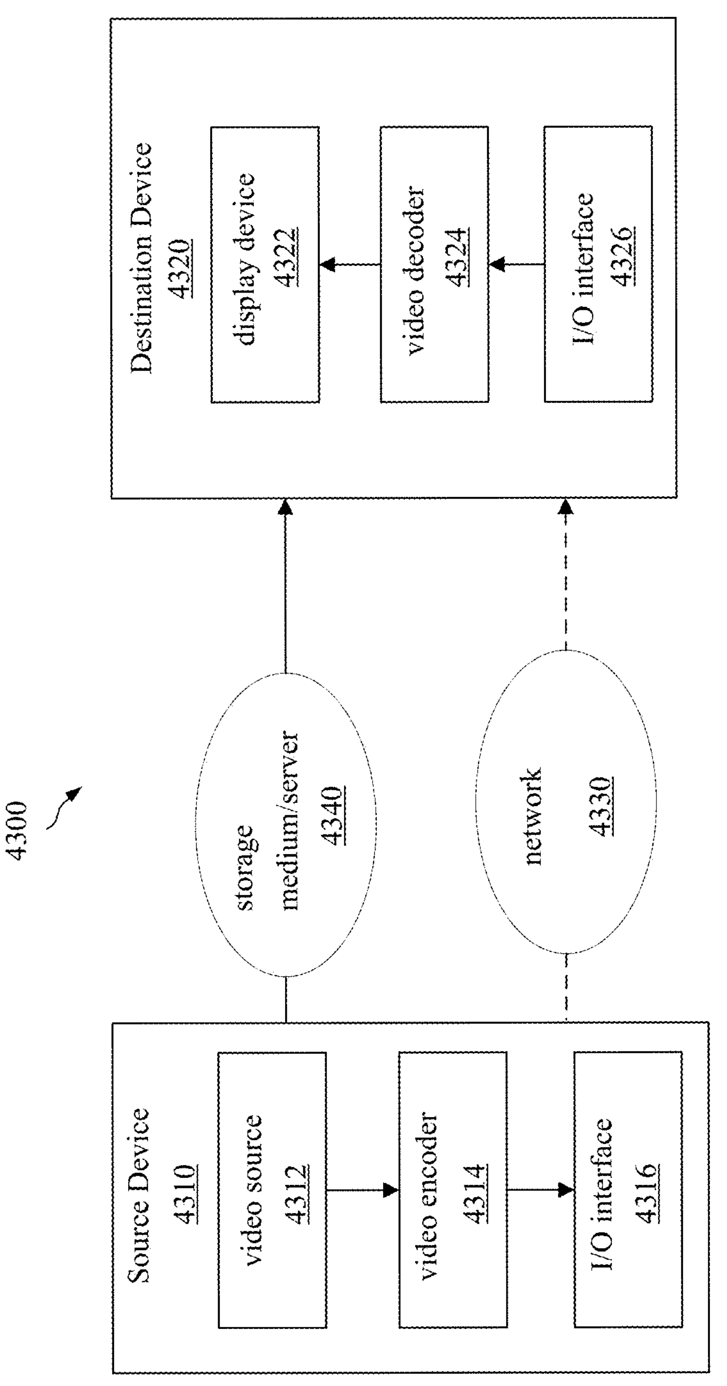
FIG. 11 is a block diagram that illustrates an example video coding system.

FIG. 11 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVM) standard and other current and/or further standards.

Figure 12:
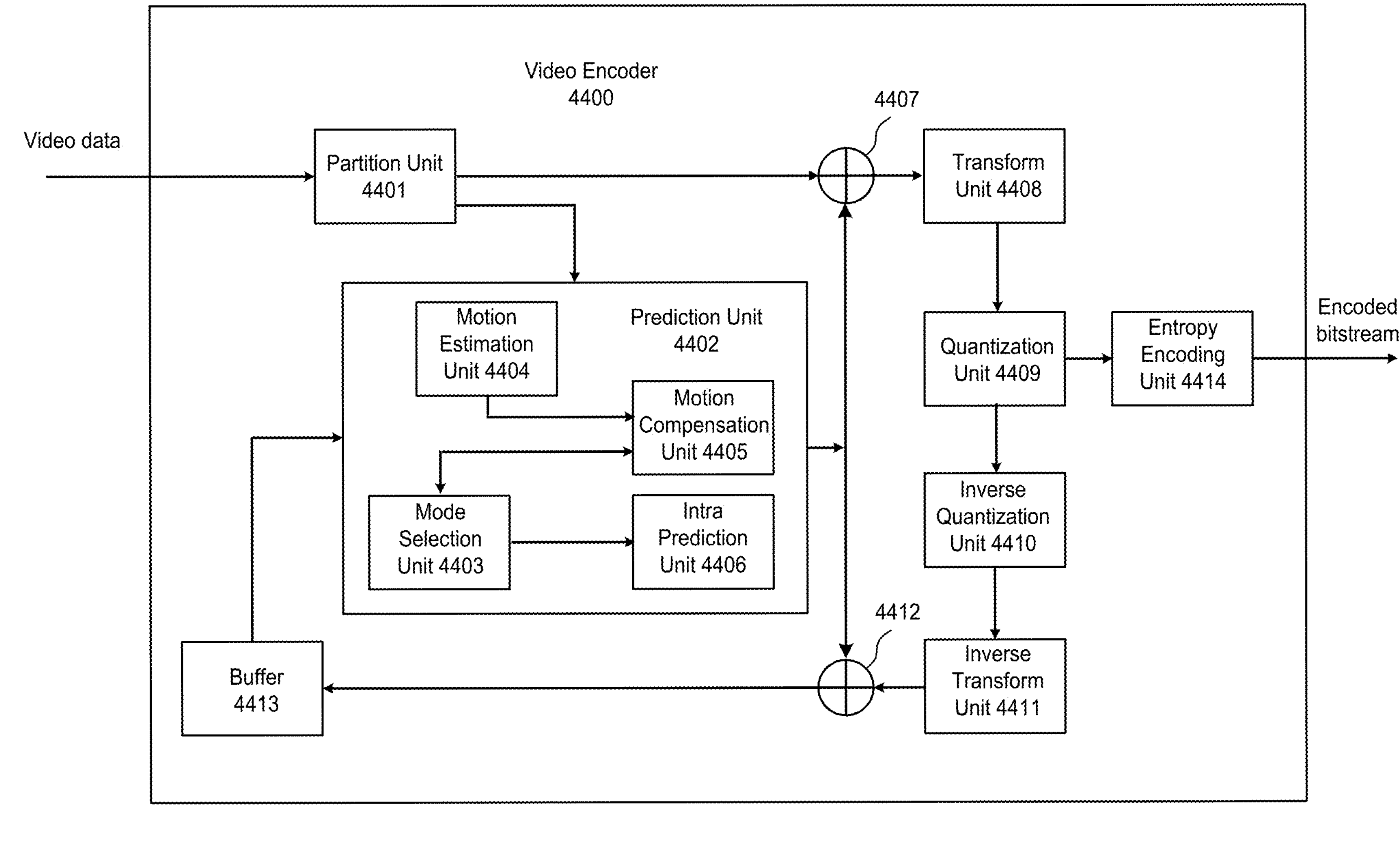
FIG. 12 is a block diagram illustrating an example of video encoder.

FIG. 12 is a block diagram illustrating an example of video encoder 4400, which may be video encoder 4314 in the system 4300 illustrated in FIG. 11. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 13:
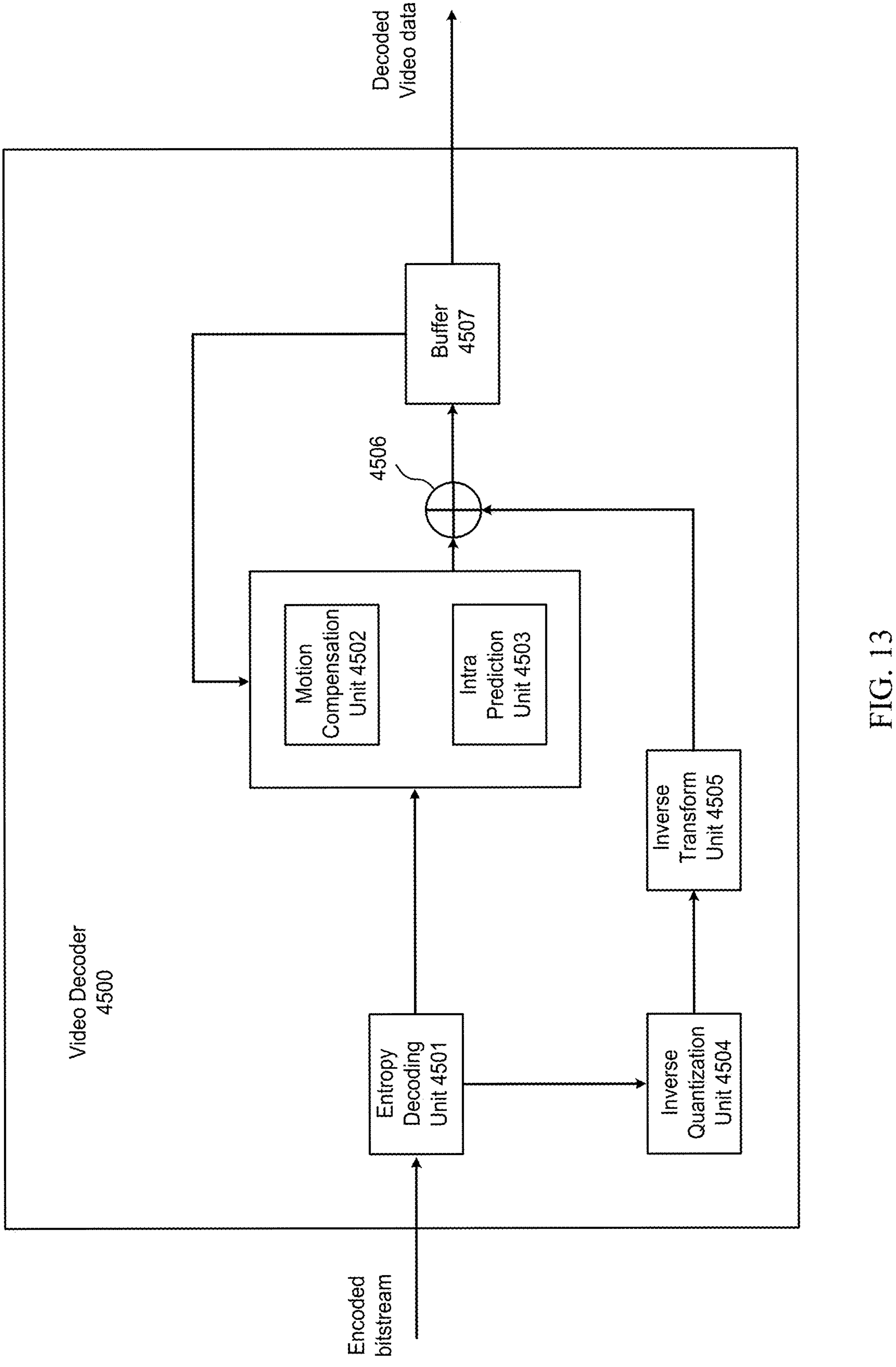
FIG. 13 is a block diagram illustrating an example of video decoder.

FIG. 13 is a block diagram illustrating an example of video decoder 4500 which may be video decoder 4324 in the system 4300 illustrated in FIG. 11. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 14:
FIG. 14 is a schematic diagram of an example encoder.
Figure 14:
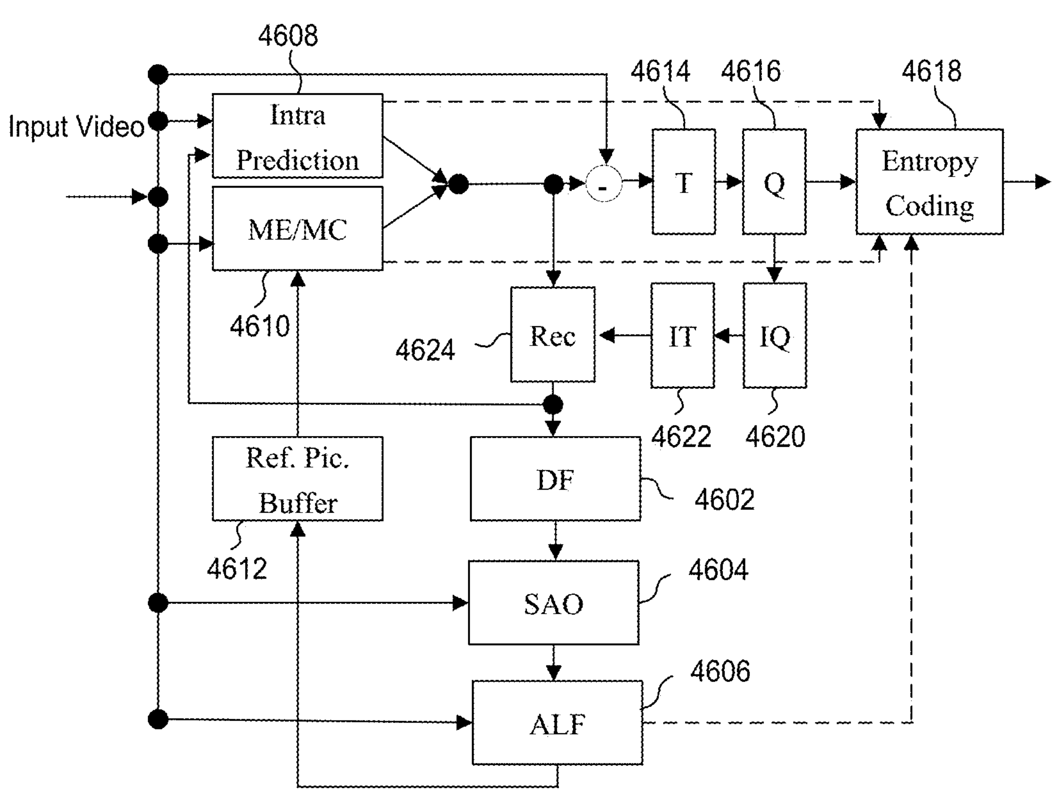

FIG. 14 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

Figure 15:
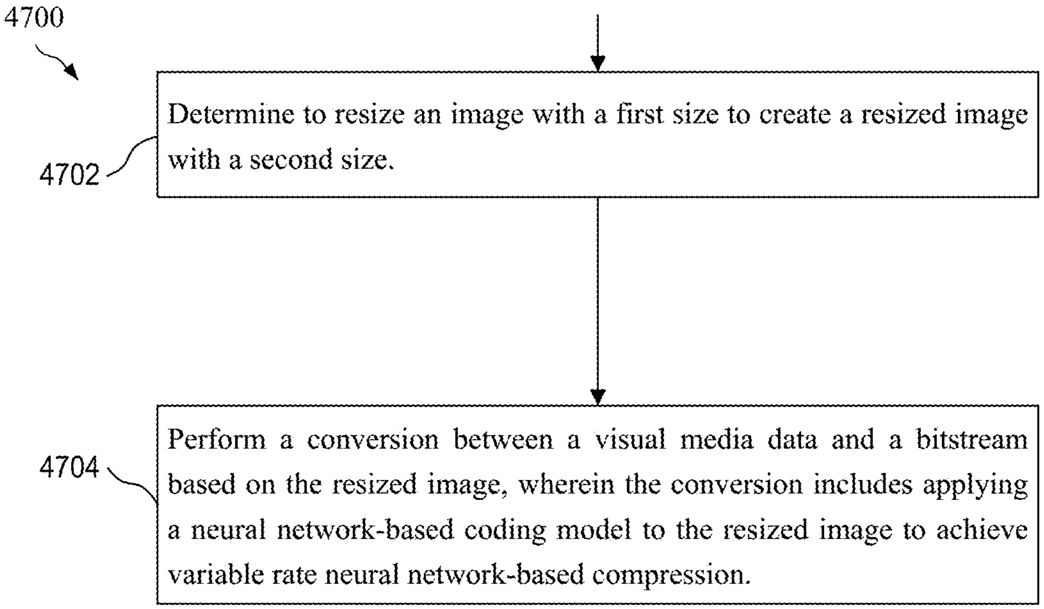
FIG. 15 is a flowchart for an example method of video processing.

FIG. 15 is a flowchart for an example method 4700 of video processing. At step 4702, a determination is made to resize an image with a first size to create a resized image with a second size. At step 4704, a conversion is performed between a visual media data and a bitstream based on the resized image. The conversion includes applying a neural network-based coding model to the resized image to achieve variable rate neural network-based compression. The conversion may include encoding at an encoder, decoding at a decoder, or combinations thereof.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200. Further, a non-transitory computer-readable recording medium may store a bitstream of a video which is generated by the method 4200 as performed by a video processing apparatus. In addition, the method 4200 can be performed by an apparatus for processing video data comprising a processor and a non-transitory memory with instructions thereon. The instructions, upon execution by the processor, cause the processor to perform method 4200.

A listing of solutions preferred by some examples is provided next.

The following solutions show examples of techniques discussed herein.

1. A method for processing video data (e.g., method 4200 depicted in FIG. 10) comprising: determining (4202) to resize an image to create a resized image and apply a coding process to the resized image; and performing (4204) a conversion between a visual media data and a bitstream based on the resized image.
2. The method of solution 1, wherein the resizing includes upsampling the image.
3. The method of any of solutions 1-2, wherein the coding process is performed by a neural network model, and wherein the resizing includes upsampling of the image when a base rate of the neural network models is smaller than a lower bound.
4. The method of any of solutions 1-3, wherein resizing includes downsampling the image.
5. The method of any of solutions 1-4, wherein the coding process is performed by a neural network model, and wherein the resizing includes downsampling of the image when a base rate of the neural network models is larger than a lower bound.
6. The method of any of solutions 1-5, wherein size information describing the resized image is included in the bitstream.
7. The method of any of solutions 1-6, wherein the size information includes a width, a height, a ratio of height and width, a number of samples, a number of groups of samples of a predefined size, a size index, or combinations thereof.
8. The method of any of solutions 1-7, wherein sample padding or sample cropping is applied to the image prior to resizing.
9. The method of any of solutions 1-8, wherein sample padding or sample cropping is applied to the image after resizing.
10. The method of any of solutions 1-9, wherein resizing is performed based on a color format or a color component of the image.
11. The method of any of solutions 1-10, wherein the resizing is performed by a filter.
12. The method of any of solutions 1-11, wherein the filter used for resizing is indicated in the bitstream.

13. The method of any of solutions 1-12, wherein the filter is a neural network filter, a lanczos filter, a bilinear filter, a bicubic filter, or combinations thereof.
14. The method of any of solutions 1-13, wherein the resizing is selected from a group of resizing candidates, and wherein a resizing candidate indicating the selected resizing is signaled in the bitstream.
15. The method of any of solutions 1-14, wherein the coding process is applied by a coding model selected from a group of coding model candidates, and wherein a coding model candidate indicating the coding model is signaled in the bitstream.
16. The method of any of solutions 1-15, wherein the group of coding model candidates include coding models pretrained with different Lagrange multipliers.
17. The method of any of solutions 1-16, wherein the image is resized to the group of resizing candidates that each meet a target bitrate.
18. The method of any of solutions 1-17, wherein the group of coding model candidates is selected to meet a target rate.
19. The method of any of solutions 1-18, wherein the conversion includes encoding the visual media data into the bitstream.
20. The method of any of solutions 1-19, wherein the conversion includes decoding the visual media data from the bitstream.
21. An apparatus for processing video data comprising: a processor; and a non-transitory memory with instructions thereon, wherein the instructions upon execution by the processor, cause the processor to perform the method of any of solutions 1-20.
22. A non-transitory computer-readable recording medium storing a bitstream of a video which is generated by a method performed by a video processing apparatus, wherein the method comprises: determining to resize an image to create a resized image and apply a coding process to the resized image; and generating a bitstream based on the determining.
23. A method for storing bitstream of a video comprising: determining to resize an image to create a resized image and apply a coding process to the resized image; generating a bitstream based on the determining; and storing the bitstream in a non-transitory computer-readable recording medium.

Additional solutions show examples of techniques discussed herein.

1. A method for processing video data comprising: determining to resize an image with a first size to create a resized image with a second size; and performing a conversion between a visual media data and a bitstream based on the resized image, wherein the conversion includes applying a neural network-based coding model to the resized image to achieve variable rate neural network-based compression.
2. The method of solution 1, wherein the resizing includes upsampling the image or downsampling the image.
3. The method of any of solutions 1-2, wherein size information describing the first size of the image and the second size of the resized image is included in the bitstream.
4. The method of any of solutions 1-3, wherein the size information includes a width and a height, and wherein the size information is indicated in samples of a component or a number (N) of samples of the component.
5. The method of any of solutions 1-4, wherein the first size and the second size are signaled independently, predictively, as a ratio, between the first size and the second size, or combinations thereof.
6. The method of any of solutions 1-5, wherein a resized width of the resized image is proportional to an initial width of the image, and wherein a resized height of the resized image is proportional to an initial height of the image.
7. The method of any of solutions 1-6, wherein a ratio of the resized width to the initial width is equivalent to a ratio of the resized height to the initial height.
8. The method of any of solutions 1-7, wherein sample padding or sample cropping is applied to the image prior to resizing.
9. The method of any of solutions 1-8, wherein sample padding or sample cropping is applied to the image after resizing.
10. The method of any of solutions 1-9, wherein a message is signaled in a bitstream to indicate whether the image should be resized.
11. The method of any of solutions 1-10, wherein size information related to the first size, size information related to the second size, or a size ratio between the first size and the second size is only signaled when the image should be resized.
12. The method of any of solutions 1-11, wherein the resizing includes upsampling of the image when a base rate of the neural network models is smaller than a lower bound or downsampling of the image when a base rate of the neural network models is larger than a lower bound.
13. The method of any of solutions 1-12, wherein the resizing is performed by a lanczos filter, a bilinear filter, a bicubic filter, a nearest neighbor filter, or combinations thereof.
14. The method of any of solutions 1-13, wherein resizing employs a same type of filter when encoding and when decoding.
15. The method of any of solutions 1-14, wherein size information is signaled with at least one index, and wherein the index indicates a predefined size, width, height, or ratio.
16. The method of any of solutions 1-15, wherein resizing usage depends on color component or color format, or wherein different color components are resized by different resizing processes, or wherein a luma component is coded with resizing but a chroma component is not coded with resizing, or wherein different components are resized using different size parameters, or wherein a luma component is resized using a first size parameter and a chroma component is resized using a second parameter, or wherein the image is a reconstructed output image or an input image, or wherein a size parameter includes a width value, a height value, or combinations thereof.
17. The method of any of solutions 1-16, wherein resizing is performed using a filter, wherein the filter is a separable filter including a horizontal filter and a vertical filter, or wherein a type of the filter used for resizing is indicated in the bitstream, or wherein a length of the filter is indicated in the bitstream, is determined by a number of taps of the filter, or is defined as a length of the filter in a horizontal or a vertical direction, or wherein at least two different types of filters can be indicated in the bitstream where a first filter is applied to a first component of a reconstructed output image, and a second filter is applied to a second component of the reconstructed output image, or wherein a type of the filter is used to determine a length of the filter or coefficients of the filter, or wherein an index is indicated in the bitstream to determine which filter in a set of filters is applied for the resizing, or wherein an indication is included in the bitstream that indicate which filter among a set of filters is applied for resizing where a first value of the indication indicates a 3-tap filter is applied for resizing and a second value of the indication indicates an 8-tap filter is applied for resizing, or wherein an indication indicates weight values used for filtering, or wherein the filter is implemented as a convolution layer or a deconvolution layer of a neural network.

18. The method of any of solutions 1-17, wherein a set of candidate models used to code an image signal depends on whether usage of the resizing of the image occurs before or after a coding process.

19. The method of any of solutions 1-18, wherein one or more neural network models are determined depending on whether usage of the resizing of the image occurs before or after a coding process, or wherein at least one model of the multiple models is selected and signaled in the bitstream, or wherein at least one model of the multiple models is derived, or wherein multiple models correspond to multiple bitrates.

20. The method of any of solutions 1-19, wherein one or more models are pretrained with different Lagrange multipliers, or wherein the image is resized to multiple sizes to obtain multiple candidates given a target rate, wherein one or more models are trained depending on a target bit rate, or wherein the image is downsampled or upsampled, or wherein a resized width and height are proportional to an original width and height, or wherein a resized width and height are not proportional to an original width and height, or wherein changing a number of pixels for width or height is used to obtain resized candidates, or wherein changing a total number of pixels is used to obtain resized candidates, or wherein changing a ratio of a resized size to an original image size is used to obtain resized candidates where the ratio is a width, a height, or total number of pixels, or wherein the image is required to include a multiple of 32 or 64 pixels along both width and height to eliminate boundary artifacts, or wherein different filters are used in upsampling and downsampling, or wherein neural network-based filters are used, or wherein deep filters for image super resolution are used, or wherein different types of filters are used for encoding and decoding, or wherein a lanczos filter is used for encoding and a bicubic filter is used for decoding.

21. The method of any of solutions 1-20, wherein a resized width and a resized height are included in the bitstream, or wherein an index of a resized size corresponding to a predefined resized size list is included in the bitstream, or wherein at least one filter index corresponding to a list of predefined filter pairs is included in the bitstream.

22. The method of any of solutions 1-21, wherein a rate-distortion optimization (RDO) process is used to select the one with best rate distortion (RD) performance from candidates, or wherein anchor results are used as references to calculate RD loss in the RDO process, wherein results of a codec are used as anchor results, or wherein results of a model using fixed quantization parameters (QP) without resizing are used as anchor results, or wherein anchor results are obtained by selecting a candidate with a best of a specific metric for a certain rate point, or wherein an RD loss in the RDO process includes one or more metrics, or wherein an RD loss in the RDO process is calculated on one or more rate points, or wherein an RD loss is calculated using three fixed rate then analyzing all candidates using a set of 4th rate points to select a best 4th rate point, or wherein 4 rate points are used, 10 candidates are analyzed in each rate point, and $10^4$ combinations are analyzed to obtain a combination with a least RD loss.

23. The method of any of solutions 1-22, wherein the message is signaled as a flag, a truncated unary code, a truncated binary code, an exponential Golomb code, a fixed length code, or wherein the message is coded with at least one arithmetic coding context or bypass coding.

24. An apparatus for processing video data comprising: a processor; and a non-transitory memory with instructions thereon, wherein the instructions upon execution by the processor, cause the processor to perform the method of any of solutions 1-23.

25. A non-transitory computer-readable recording medium storing a bitstream of a video which is generated by a method performed by a video processing apparatus, wherein the method comprises: determining to resize an image with a first size to create a resized image with a second size; and generating a bitstream based on the determining, wherein the generating includes applying a neural network-based coding model to the resized image to achieve variable rate neural network-based compression.

26. A method for storing bitstream of a video comprising: determining to resize an image with a first size to create a resized image with a second size; generating a bitstream based on the determining, wherein the generating includes applying a neural network-based coding model to the resized image to achieve variable rate neural network-based compression; and storing the bitstream in a non-transitory computer-readable recording medium.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:

determining to resize a first image with a first size to create a second image with a second size, wherein the first size is different from the second size; and performing a conversion between a visual media data and a bitstream based on the second image, wherein the conversion includes applying a neural network-based coding model to the second image to achieve variable rate neural network-based compression, wherein a set of candidate models used to code an image signal depends on whether a usage of the resizing of the first image occurs before or after a coding process;

wherein one candidate model or multiple candidate models are determined depending on whether the usage of the resizing of the first image occurs before or after the coding process, or wherein at least one candidate model of the multiple candidate models is selected and signaled in the bitstream, or wherein at least one candidate model of the multiple candidate models is derived, or wherein the multiple candidate models correspond to multiple bitrates.

2. The method of claim 1, wherein the resizing includes upsampling the first image or downsampling the first image, or wherein the second image is resized in a revert way before being coded.

3. The method of claim 1, wherein size information describing the first size of the first image and/or size information describing the second size of the second image is included in the bitstream;

wherein each of the size information describing the first size and the size information describing the second size includes a width and a height, and wherein the width and/or the height is indicated in samples of a component or the width and/or the height is indicated in N samples of the component, wherein N is an integer.

4. The method of claim 1, wherein size information describing the first size and size information describing the second size are signaled independently; or wherein size information describing the first size and size information describing the second size are signaled in a predictive way; or wherein size information of the first size is signaled and a ratio between the first size and the second size is signaled, or size information of the second size is signaled and a ratio between the first size and the second size is signaled.

5. The method of claim 1, wherein a second width of the second image is proportional to a first width of the first image, and wherein a second height of the second image is proportional to a first height of the first image;

wherein a ratio of the second width to the first width is equivalent to a ratio of the second height to the first height.

6. The method of claim 1, wherein sample padding or sample cropping is applied to the first image prior to resizing or after resizing.

7. The method of claim 1, wherein a message is signaled in a bitstream to indicate whether the first image is determined to be resized;

wherein size information related to the first size, size information related to the second size, or a size ratio between the first size and the second size is signaled only when the first image is determined to be resized.

8. The method of claim 1, wherein the resizing includes upsampling of the first image when a base rate of the neural network models is smaller than a lower bound or downsampling of the first image when a base rate of the neural network models is larger than a lower bound;

wherein the resizing is performed by a filter, and the filter includes at least one of a lanczos filter, a bilinear filter, a bicubic filter, a nearest neighbor filter, or a neural network-based filter; or wherein the resizing employs a same type of filter when encoding and when decoding; or wherein the resizing uses different types of filters when encoding and when decoding.

9. The method of claim 1, wherein size information of the first size and/or second size is signaled with at least one index, and wherein the index indicates a predefined size, width, height, or ratio.

10. The method of claim 1, wherein the usage of the resizing depends on a color component or a color format, wherein different components of the first image are resized by different resizing processes, or wherein a luma component of the first image is coded with resizing but a chroma component of the first image is not coded with resizing, or wherein different components of the first image are resized using different size parameters, or wherein a luma component of the first image is resized using a first size parameter and a chroma component of the first image is resized using a second size parameter, or wherein the first image is a reconstructed output image or an input image, or wherein each of a first size parameter related to a luma component of the first image and a second size parameter related to a chroma component of the first image includes at least one of a width value and a height value.

11. The method of claim 1, wherein the resizing is performed using a filter, wherein the filter is a separable filter including a horizontal filter and a vertical filter, or wherein a type of the filter is indicated in the bitstream, a length of the filter is indicated in the bitstream, the length of the filter is determined by a number of taps of the filter or is defined as a length of the filter in a horizontal or a vertical direction, or wherein at least two different types of filters are indicated in the bitstream and include a first filter and a second filter, the first filter is applied to a first component of a reconstructed output image, and the second filter is applied to a second component of the reconstructed output image, or wherein a type of the filter is used to determine a length of the filter or coefficients of the filter, or wherein an index is indicated in the bitstream to determine which filter in a set of filters is applied for the resizing, or wherein an indication is included in the bitstream and indicates which filter among a set of filters is applied for the resizing, a first value of the indication indicates a 3-tap filter is applied for the resizing and a second value of the indication indicates an 8-tap filter is applied for the resizing, or wherein an indication indicates weight values used for filtering, or wherein the filter is implemented as a convolution layer or a deconvolution layer of a neural network.

12. The method of claim 1, wherein one or more models are pretrained with different Lagrange multipliers, or wherein the first image is resized to multiple sizes to obtain multiple candidates given a target rate, wherein the one or more models are trained depending on a target bit rate, or wherein the first image is downsampled or upsampled, or wherein a second width of the second image is proportional to a first width of the first image and a second height of the second image is proportional to a first height of the first image, or wherein a second width of the second image is not proportional to a first width of the first image and a second height of the second image is not proportional to a first height of the first image, or wherein changing a number of pixels for width or height is used to obtain resized candidates, or wherein changing a total number of pixels is used to obtain resized candidates, or wherein changing a ratio of the second size to the first size is used to obtain resized candidates, the ratio is a width, a height, or total number of pixels, or wherein the first image is required to include a multiple of 32 or 64 pixels along both width and height to eliminate boundary artifacts, or wherein different filters are used in a upsampling process of the first image and a downsampling process of the first image, or wherein neural network-based filters are used, or wherein deep filters for image super resolution are used, or wherein different types of filters are used for encoding and decoding, or wherein a lanczos filter is used for encoding and a bicubic filter is used for decoding.

13. The method of claim 1, wherein a second width and a second height of the second image are included in the bitstream, or wherein an index of the second size corresponding to a predefined resized size list is included in the bitstream, or wherein at least one filter index corresponding to a list of predefined filter pairs is included in the bitstream.

14. The method of claim 1, wherein a rate-distortion optimization (RDO) process is used to select one candidate with best rate distortion (RD) performance from all candidates, or wherein anchor results are used as references to calculate RD loss in the RDO process, wherein results of a codec are used as the anchor results, or results of a model obtained by using fixed quantization parameters (QP) without resizing are used as the anchor results, or the anchor results are obtained by selecting a candidate with a best of a specific metric for a certain rate point, or wherein an RD loss in the RDO process includes one or more metrics, or wherein an RD loss in the RDO process is calculated on one or more rate points, in a case that the one or more rate points include four rate points in total, an RD loss is calculated using three rate points that are fixed of the four rate points, all candidates in a fourth rate point of the four rate points are traversed to select a best candidate for the fourth rate point, or in a case that the one or more rate points include four rate points in total and each rate point includes 10 candidates, and all combinations corresponding to the four rate points are traversed to obtain a combination with a least RD loss.

15. The method of claim 1, wherein a message is signaled as a flag, a truncated unary code, a truncated binary code, an exponential Golomb code, a fixed length code, or wherein a message is coded with at least one arithmetic coding context or bypass coding.

16. The method of claim 1, wherein the conversion includes encoding the visual media data into the bitstream.

17. The method of claim 1, wherein the conversion includes decoding the visual media data from the bitstream.

18. An apparatus for processing video data comprising a processor and a non-transitory memory with instructions thereon, wherein the instructions upon execution by the processor, cause the processor to:

determine to resize a first image with a first size to create a second image with a second size, wherein the first size is different from the second size; and perform a conversion between a visual media data and a bitstream based on the second image, wherein the conversion includes applying a neural network-based coding model to the second image to achieve variable rate neural network-based compression, wherein a set of candidate models used to code an image signal depends on whether a usage of the resizing of the first image occurs before or after a coding process;

wherein one candidate model or multiple candidate models are determined depending on whether the usage of the resizing of the first image occurs before or after the coding process, or wherein at least one candidate model of the multiple candidate models is selected and signaled in the bitstream, or wherein at least one candidate model of the multiple candidate models is derived, or wherein the multiple candidate models correspond to multiple bitrates.

19. A non-transitory computer-readable recording medium storing a bitstream of a video which is generated by a method performed by a video processing apparatus, wherein the method comprises:

determining to resize a first image with a first size to create a second image with a second size, wherein the first size is different from the second size; and generating the bitstream based on the determining, wherein the generating includes applying a neural network-based coding model to the second image to achieve variable rate neural network-based compression, wherein a set of candidate models used to code an image signal depends on whether a usage of the resizing of the first image occurs before or after a coding process;

wherein one candidate model or multiple candidate models are determined depending on whether the usage of the resizing of the first image occurs before or after the coding process, or wherein at least one candidate model of the multiple candidate models is selected and signaled in the bitstream, or wherein at least one candidate model of the multiple candidate models is derived, or wherein the multiple candidate models correspond to multiple bitrates.

20. The apparatus of claim 18, wherein size information describing the first size and size information describing the second size are signaled independently; or wherein size information describing the first size and size information describing the second size are signaled in a predictive way; or wherein size information of the first size is signaled and a ratio between the first size and the second size is signaled, or size information of the second size is signaled and a ratio between the first size and the second size is signaled.

* * * * *